United States Patent
Wakabayashi

(10) Patent No.: US 9,344,214 B2
(45) Date of Patent: May 17, 2016

(54) OPTICAL WAVELENGTH PATH REARRANGING METHOD, COMPUTER PRODUCT, OPTICAL TRANSMISSION MANAGING APPARATUS, AND OPTICAL TRANSMISSION APPARATUS

(71) Applicant: FUJITSU LIMITED, Kawasaki-shi, Kanagawa (JP)

(72) Inventor: Jun Wakabayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 14/155,738

(22) Filed: Jan. 15, 2014

(65) Prior Publication Data

US 2014/0294384 A1 Oct. 2, 2014

(30) Foreign Application Priority Data

Mar. 26, 2013 (JP) ................. 2013-065273

(51) Int. Cl.
*H04J 14/02* (2006.01)
(52) U.S. Cl.
CPC ......... *H04J 14/0257* (2013.01); *H04J 14/0227* (2013.01); *H04J 14/0238* (2013.01); *H04J 14/0254* (2013.01)

(58) Field of Classification Search
None
See application file for complete search history.

(56) References Cited

U.S. PATENT DOCUMENTS

2012/0224846 A1* 9/2012 Swanson et al. ................. 398/13
2012/0237212 A1 9/2012 Nishihara et al.

FOREIGN PATENT DOCUMENTS

| JP | 2012-109928 | 6/2012 |
| JP | 2012-195787 | 10/2012 |

\* cited by examiner

*Primary Examiner* — Darren E Wolf
(74) *Attorney, Agent, or Firm* — Fujitsu Patent Center

(57) ABSTRACT

An optical wavelength path rearranging method includes detecting time that elapses since a setting of optical wavelength paths in an optical wavelength division multiplexing network; and moving to a predetermined long-period optical wavelength range, an optical wavelength path that is among the optical wavelength paths and for which the detected elapsed time is long, where the optical wavelength path rearranging method is executed by a processor.

5 Claims, 39 Drawing Sheets

| OPTICAL WAVE-LENGTH PATH ID | OPTICAL WAVELENGTH PATH ROUTE INFORMATION | ELAPSED TIME | LONG ELAPSED PERIOD | WAITING FOR VACANCY |
|---|---|---|---|---|
| 1 | *1 | 24 | REACHED | NONE |
| 2 | *1 | 15 | REACHED | NONE |
| 3 | *1 | 3 | NOT-REACHED | NONE |
| ... | ... | ... | ... | ... |
| n-1 | *1 | 31 | REACHED | SUSPENDED |
| n | *1 | 5 | NOT-REACHED | NONE |

*1: NECESSARY INFORMATION DIFFERS FOR OpS AND NE

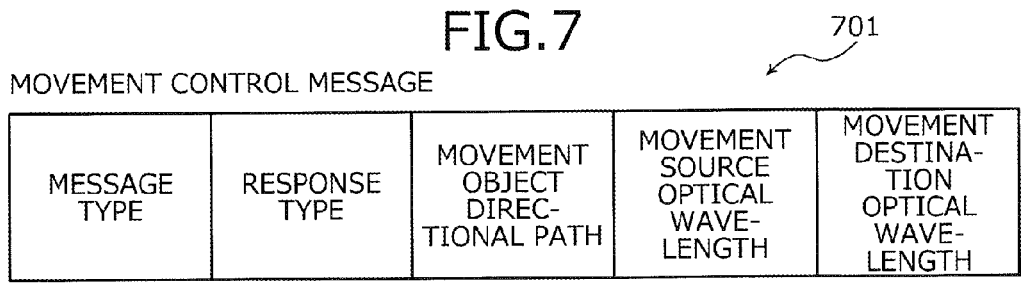
FIG.7
MOVEMENT CONTROL MESSAGE
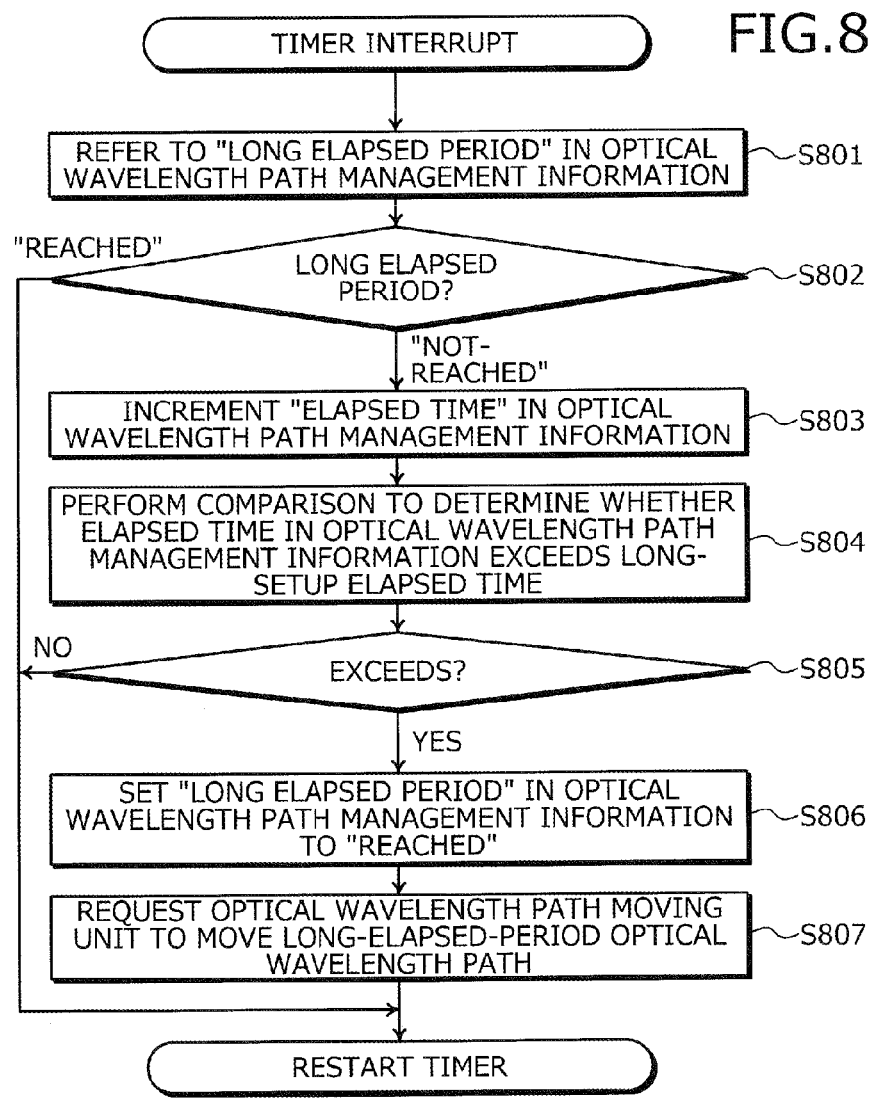

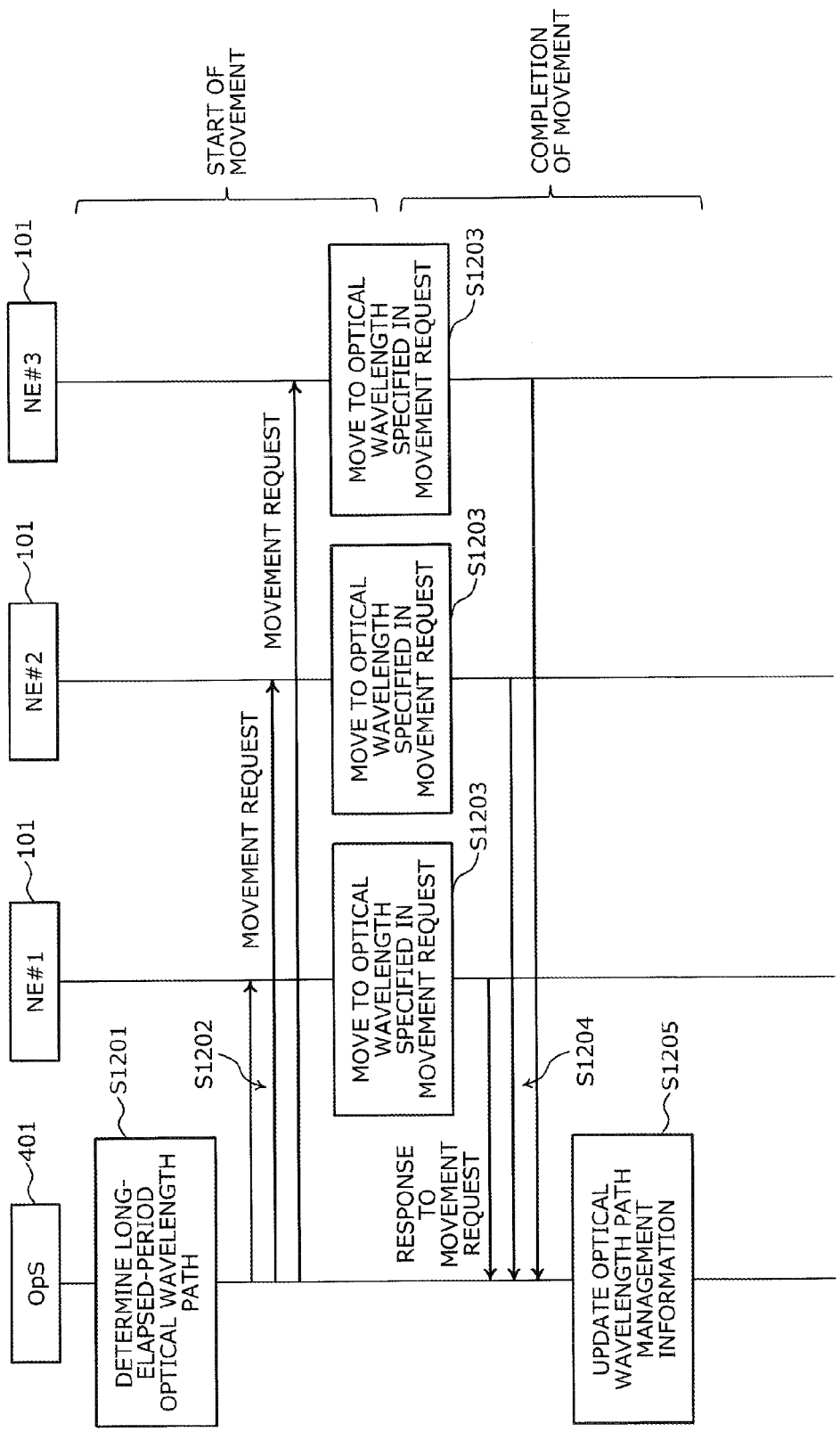

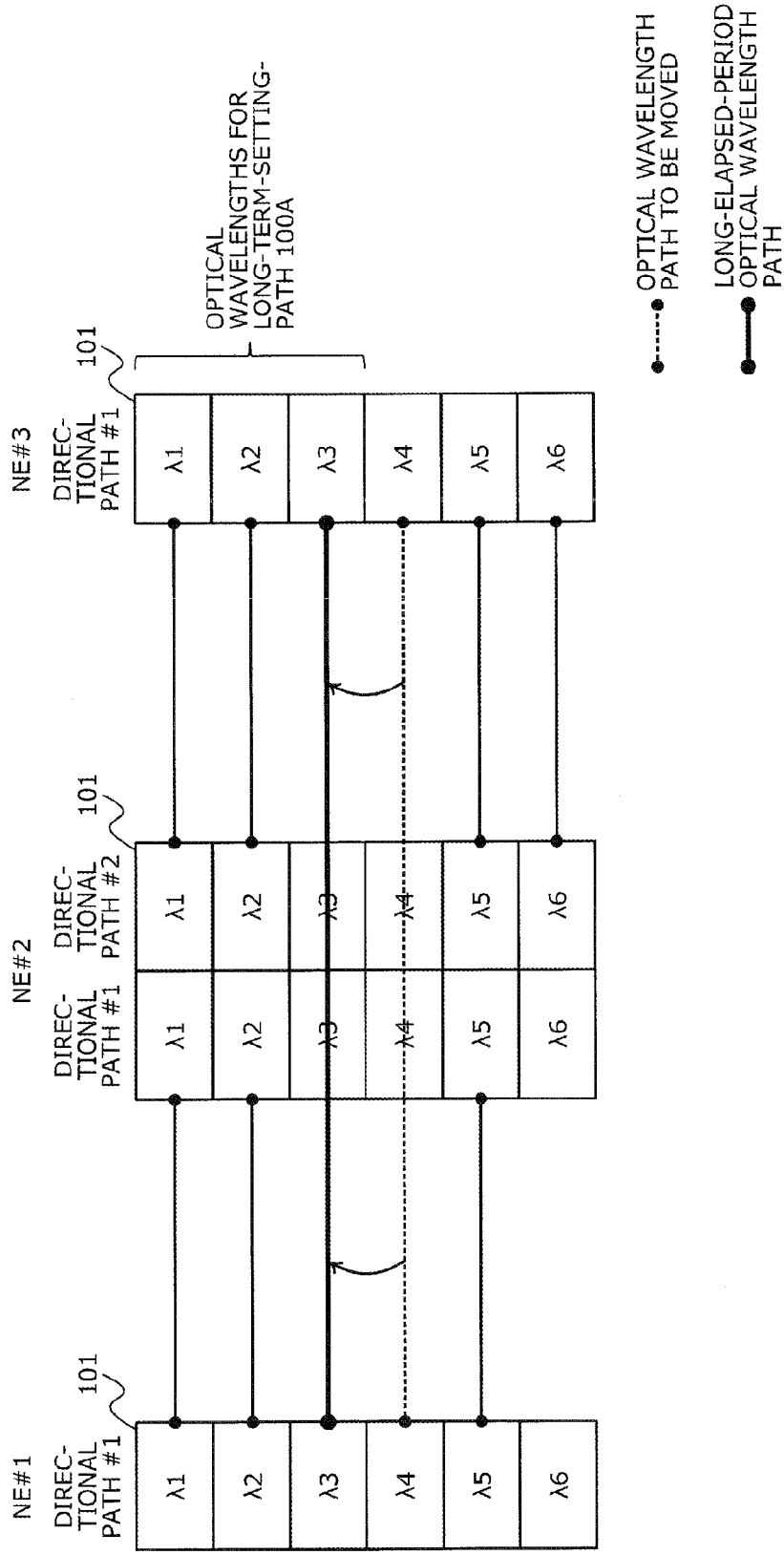

FIG.14A

AT START OF MOVEMENT FOR OPTIMIZATION

OPTICAL WAVELENGTH PATH MANAGEMENT INFORMATION 1401        210        1402

| OPTICAL PATH ID | WAVE-LENGTH | Add NODE ID | Thru NODE ID (1) | Thru NODE ID (2) | ... | Thru NODE ID (n) | Drop NODE ID | ELAPSED TIME | LONG ELAPSED PERIOD | WAITING FOR VACANCY |
|---|---|---|---|---|---|---|---|---|---|---|
| 1 | λ4 | 1 | 2 | - |  | - | 3 | 10 | REACHED | NONE |
| 2 | λ1 | 2 | - | - |  | - | 3 | 9 | NOT-REACHED | NONE |
| 3 | λ1 | 1 | - | - |  | - | 2 | 8 | NOT-REACHED | NONE |
| 4 | λ5 | 1 | - | - |  | - | 2 | 3 | NOT-REACHED | NONE |
| 5 | λ5 | 2 | - | - |  | - | 3 | 3 | NOT-REACHED | NONE |
| 6 | λ2 | 1 | - | - |  | - | 2 | 2 | NOT-REACHED | NONE |
| 7 | λ2 | 2 | - | - |  | - | 3 | 2 | NOT-REACHED | NONE |
| 8 | λ6 | 2 | - | - |  | - | 3 | 2 | NOT-REACHED | NONE |
| 9 | - | - | - | - |  | - | - | - | - | - |

FIG.14B

AT COMPLETION OF MOVEMENT FOR OPTIMIZATION

OPTICAL WAVELENGTH PATH MANAGEMENT INFORMATION        210

| OPTICAL PATH ID | WAVE-LENGTH | Add NODE ID | Thru NODE ID (1) | Thru NODE ID (2) | ... | Thru NODE ID (n) | Drop NODE ID | ELAPSED TIME | LONG ELAPSED PERIOD | WAITING FOR VACANCY |
|---|---|---|---|---|---|---|---|---|---|---|
| 1 | λ3 | 1 | 2 | - |  | - | 3 | 10 | REACHED | NONE |
| 2 | λ1 | 2 | - | - |  | - | 3 | 9 | NOT-REACHED | NONE |
| 3 | λ1 | 1 | - | - |  | - | 2 | 8 | NOT-REACHED | NONE |
| 4 | λ5 | 1 | - | - |  | - | 2 | 3 | NOT-REACHED | NONE |
| 5 | λ5 | 2 | - | - |  | - | 3 | 3 | NOT-REACHED | NONE |
| 6 | λ2 | 1 | - | - |  | - | 2 | 2 | NOT-REACHED | NONE |
| 7 | λ2 | 2 | - | - |  | - | 3 | 2 | NOT-REACHED | NONE |
| 8 | λ6 | 2 | - | - |  | - | 3 | 2 | NOT-REACHED | NONE |
| 9 | - | - | - | - |  | - | - | - | - | - |

1403

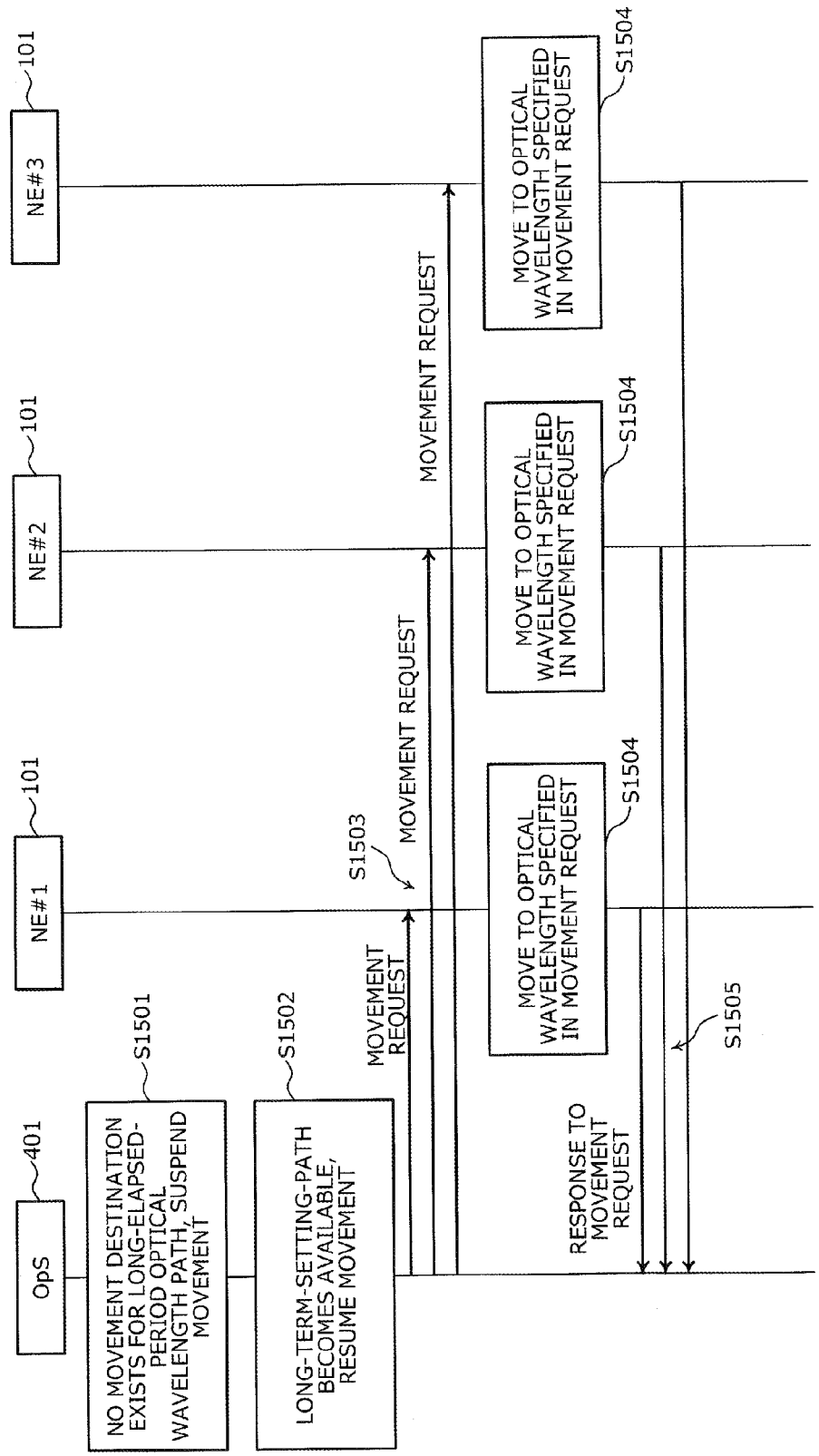

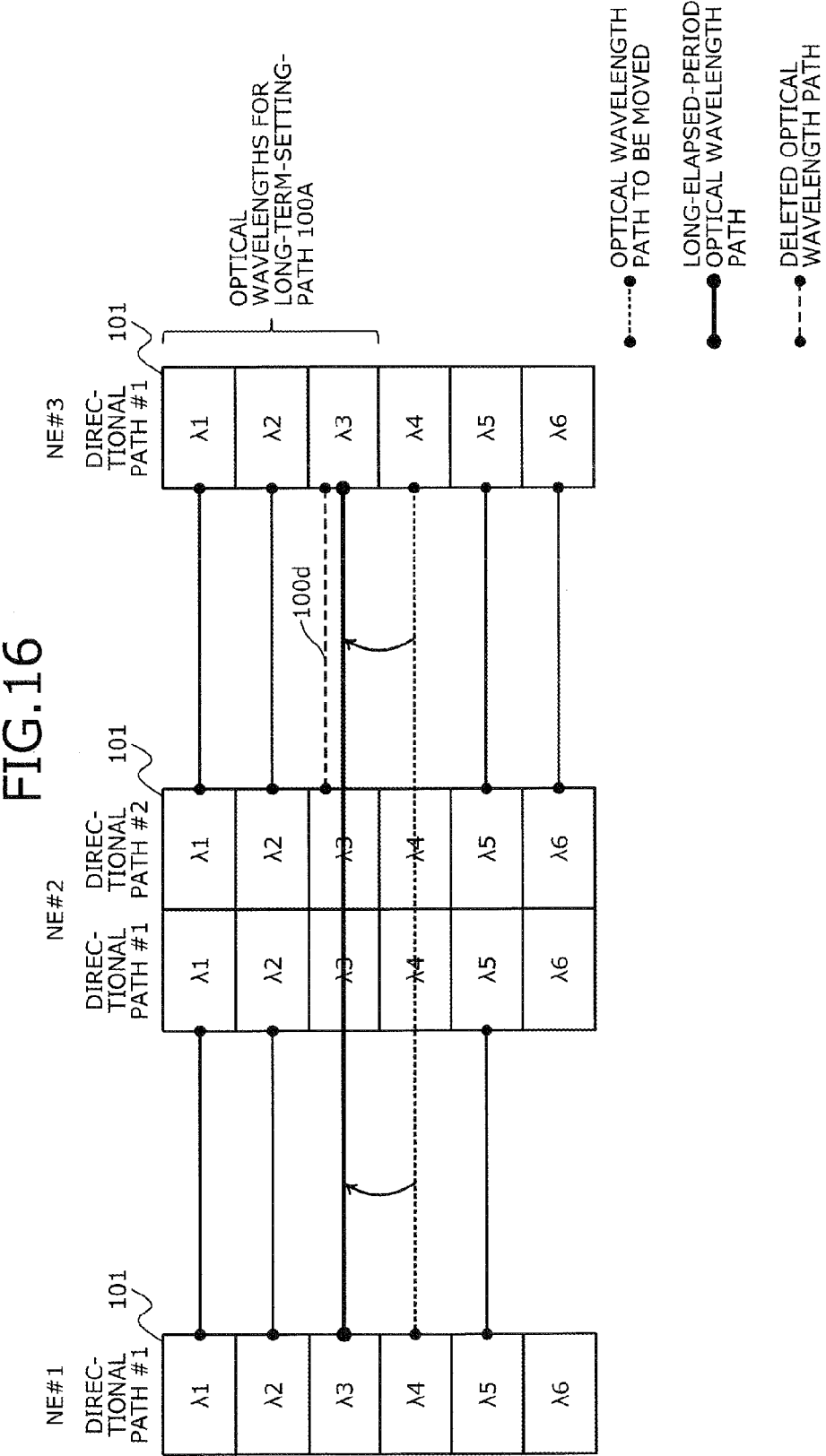

FIG.17A

AT START OF SUSPENSION OF MOVEMENT

OPTICAL WAVELENGTH PATH MANAGEMENT INFORMATION  1701  1702  1703  210

| OPTI-CAL PATH ID | WAVE-LENGTH | Add NODE ID | Thru NODE ID (1) | Thru NODE ID (2) | ... | Thru NODE ID (n) | Drop NODE ID | ELAPSED TIME | LONG ELAPSED PERIOD | WAITING FOR VACANCY |
|---|---|---|---|---|---|---|---|---|---|---|
| 1 | λ4 | 1 | 2 | - |  | - | 3 | 10 | REACHED | WAITING |
| 2 | λ1 | 2 | - | - |  | - | 3 | 9 | NOT-REACHED | NONE |
| 3 | λ1 | 1 | - | - |  | - | 2 | 8 | NOT-REACHED | NONE |
| 4 | λ5 | 1 | - | - |  | - | 2 | 3 | NOT-REACHED | NONE |
| 5 | λ3 | 2 | - | - |  | - | 3 | 3 | NOT-REACHED | NONE |
| 6 | λ2 | 1 | - | - |  | - | 2 | 2 | NOT-REACHED | NONE |
| 7 | λ2 | 2 | - | - |  | - | 3 | 2 | NOT-REACHED | NONE |
| 8 | λ6 | 2 | - | - |  | - | 3 | 2 | NOT-REACHED | NONE |
| 9 | - | - | - | - |  | - | - | - | - | - |

FIG.17B

AT CANCELATION OF SUSPENSION

OPTICAL WAVELENGTH PATH MANAGEMENT INFORMATION  210

| OPTI-CAL PATH ID | WAVE-LENGTH | Add NODE ID | Thru NODE ID (1) | Thru NODE ID (2) | ... | Thru NODE ID (n) | Drop NODE ID | ELAPSED TIME | LONG ELAPSED PERIOD | WAITING FOR VACANCY |
|---|---|---|---|---|---|---|---|---|---|---|
| 1 | λ4 | 1 | 2 | - |  | - | 3 | 11 | REACHED | NONE |
| 2 | λ1 | 2 | - | - |  | - | 3 | 9 | NOT-REACHED | NONE |
| 3 | λ1 | 1 | - | - |  | - | 2 | 8 | NOT-REACHED | NONE |
| 4 | λ5 | 1 | - | - |  | - | 2 | 3 | NOT-REACHED | NONE |
| 5 | ~~λ3~~ | ~~2~~ | ~~-~~ | ~~-~~ |  | ~~-~~ | ~~3~~ | 3 | NOT-REACHED | NONE |
| 6 | λ2 | 1 | - | - |  | - | 2 | 2 | NOT-REACHED | NONE |
| 7 | λ2 | 2 | - | - |  | - | 3 | 2 | NOT-REACHED | NONE |
| 8 | λ6 | 2 | - | - |  | - | 3 | 2 | NOT-REACHED | NONE |
| 9 | - | - | - | - |  | - | - | - | - | - |

AT COMPLETION OF MOVEMENT FOR OPTIMIZATION

OPTICAL WAVELENGTH PATH MANAGEMENT INFORMATION                                        210

| OPTI-CAL PATH ID | WAVE-LENGTH | Add NODE ID | Thru NODE ID (1) | Thru NODE ID (2) | ... | Thru NODE ID (n) | Drop NODE ID | ELAPSED TIME | LONG ELAPSED PERIOD | WAITING FOR VACANCY |
|---|---|---|---|---|---|---|---|---|---|---|
| 1 | λ3 | 1 | 2 | - | | - | 3 | 11 | REACHED | NONE |
| 2 | λ1 | 2 | - | - | | - | 3 | 9 | NOT-REACHED | NONE |
| 3 | λ1 | 1 | - | - | | - | 2 | 8 | NOT-REACHED | NONE |
| 4 | λ5 | 1 | - | - | | - | 2 | 3 | NOT-REACHED | NONE |
| 5 | - | - | - | - | | - | - | - | - | - |
| 6 | λ2 | 1 | - | - | | - | 2 | 2 | NOT-REACHED | NONE |
| 7 | λ2 | 2 | - | - | | - | 3 | 2 | NOT-REACHED | NONE |
| 8 | λ6 | 2 | - | - | | - | 3 | 2 | NOT-REACHED | NONE |
| 9 | - | - | - | - | | - | - | - | - | - |

1705

(a) INTER-NE MESSAGE FORMAT

| MESSAGE TYPE | DETAILED TYPE | PARAMETER 1 | PARAMETER 2 |
|---|---|---|---|

2101

(b) INTER-NE MESSAGE TYPES

| MESSAGE TYPE | DETAILED TYPE | PARAMETER 1 | PARAMETER 2 |
|---|---|---|---|
| PATH MOVEMENT | REQUEST | MOVEMENT SOURCE λ | DESTINATION λ |
| | RESPONSE | MOVEMENT SOURCE λ | DETERMINATION RESULT (OK/NG) |
| PATH BLOCK CANCELATION | NOTIFICATION | RELEASED λ | - |

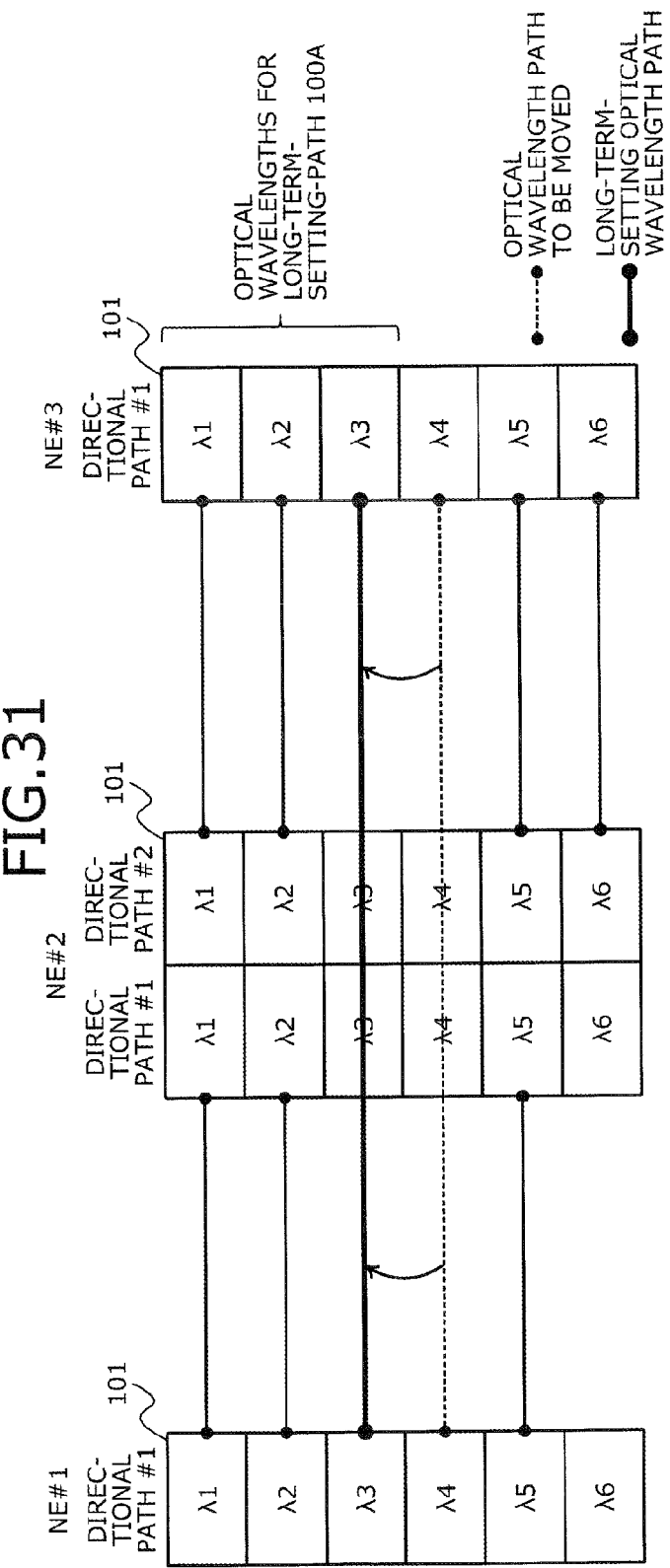

FIG.32A

AT START OF MOVEMENT FOR OPTIMIZATION

[NE#1] OPTICAL WAVELENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | λ3 | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVELENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Thru | 3 | Non | 0 | NOT-REACHED | NONE |
| 2 | 2 | λ4 | Thru | 3 | Non | 0 | NOT-REACHED | NONE |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 1 | λ5 | Drop | 2 | Non | 0 | NOT-REACHED | NONE |
| 6 | 2 | λ5 | Add | 2 | Non | 3 | NOT-REACHED | NONE |
| 7 | 1 | λ2 | Drop | 2 | Non | 0 | NOT-REACHED | NONE |
| 8 | 2 | λ6 | Add | 2 | Non | 2 | NOT-REACHED | NONE |
| - | - | - | - | - | - | - | - | - |

[NE#3] OPTICAL WAVELENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| 3 | 1 | λ5 | Drop | 2 | Non | 0 | NOT-REACHED | NONE |
| 4 | 1 | λ2 | Drop | 2 | Non | 0 | NOT-REACHED | NONE |
| 5 | 1 | λ6 | Drop | 2 | Non | 0 | NOT-REACHED | NONE |
| - | - | - | - | - | - | - | - | - |

FIG.32B

AT TIME OF MOVEMENT REQUEST

[NE#1] OPTICAL WAVELENGTH PATH MANAGEMENT INFORMATION    210

| OPTICAL PATH ID | DIREC-TION | WAVE-LENGTH | MODE | NE COUNT | DESTI-NATIONλ | ELAPSED TIME | LONG ELAPSED PERIOD | WAITING FOR VACANCY |
|---|---|---|---|---|---|---|---|---|
| 1 | 1 | λ4 | Add | 3 | λ3 | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVELENGTH PATH MANAGEMENT INFORMATION    3211

| OPTICAL PATH ID | DIREC-TION | WAVE-LENGTH | MODE | NE COUNT | DESTI-NATIONλ | ELAPSED TIME | LONG ELAPSED PERIOD | WAITING FOR VACANCY |
|---|---|---|---|---|---|---|---|---|
| 1 | 1 | λ4 | Thru | 3 | λ3 | 0 | REACHED | NONE |
| 2 | 2 | λ4 | Thru | 3 | λ3 | 0 | REACHED | NONE |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 1 | λ5 | Drop | 2 | Non | 0 | NOT-REACHED | NONE |
| 6 | 2 | λ5 | Add | 2 | Non | 3 | NOT-REACHED | NONE |
| 7 | 1 | λ2 | Drop | 2 | Non | 0 | NOT-REACHED | NONE |
| 8 | 2 | λ6 | Add | 2 | Non | 2 | NOT-REACHED | NONE |
| - | - | - | - | - | - | - | - | - |

[NE#3] OPTICAL WAVELENGTH PATH MANAGEMENT INFORMATION    3212

| OPTICAL PATH ID | DIREC-TION | WAVE-LENGTH | MODE | NE COUNT | DESTI-NATIONλ | ELAPSED TIME | LONG ELAPSED PERIOD | WAITING FOR VACANCY |
|---|---|---|---|---|---|---|---|---|
| 1 | 1 | λ3 | Drop | 3 | Non | 0 | REACHED | NONE |
| 2 | 1 | λ1 | Drop | 2 | Non | 0 | NOT-REACHED | NONE |
| 3 | 1 | λ5 | Drop | 2 | Non | 0 | NOT-REACHED | NONE |
| 4 | 1 | λ2 | Drop | 2 | Non | 0 | NOT-REACHED | NONE |
| 5 | 1 | λ6 | Drop | 2 | Non | 0 | NOT-REACHED | NONE |
| - | - | - | - | - | - | - | - | - |

FIG.32C

AT COMPLETION OF MOVEMENT FOR OPTIMIZATION

[NE#1] OPTICAL WAVE-LENGTH PATH MANAGEMENT INFORMATION — 3222

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ3 | Add | 3 | Non | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION — 3221

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ3 | Thru | 3 | Non | 0 | REACHED | NONE |
| 2 | 2 | λ3 | Thru | 3 | Non | 0 | REACHED | NONE |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 1 | λ5 | Drop | 2 | Non | 0 | NOT-REACHED | NONE |
| 6 | 2 | λ5 | Add | 2 | Non | 3 | NOT-REACHED | NONE |
| 7 | 1 | λ2 | Drop | 2 | Non | 0 | NOT-REACHED | NONE |
| 8 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ3 | Drop | 3 | Non | 0 | REACHED | NONE |
| 2 | 1 | λ1 | Drop | 2 | Non | 0 | NOT-REACHED | NONE |
| 3 | 1 | λ5 | Drop | 2 | Non | 0 | NOT-REACHED | NONE |
| 4 | 1 | λ2 | Drop | 2 | Non | 0 | NOT-REACHED | NONE |
| 5 | 1 | λ6 | Drop | 2 | Non | 0 | NOT-REACHED | NONE |
| - | - | - | - | - | - | - | - | - |

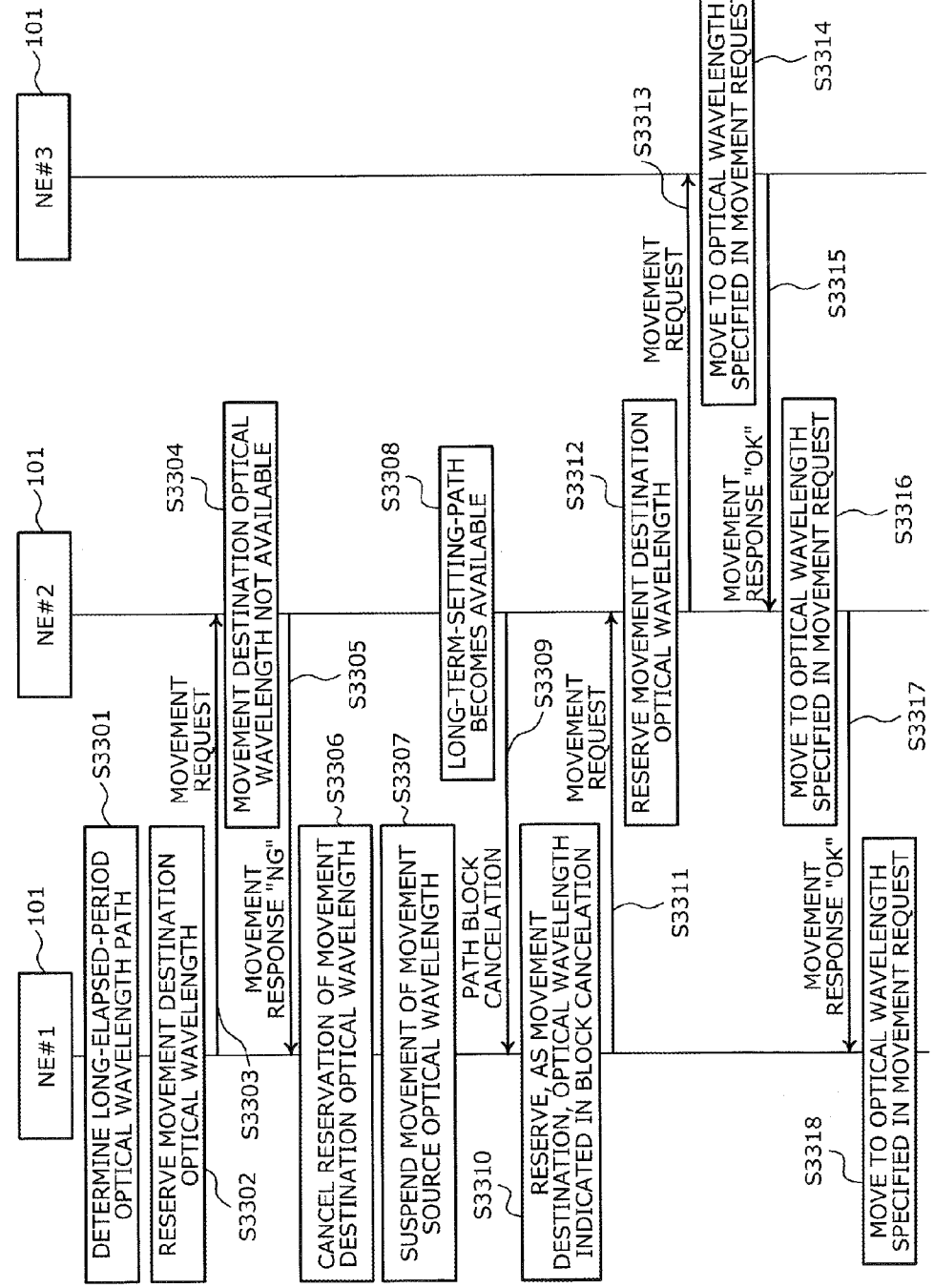

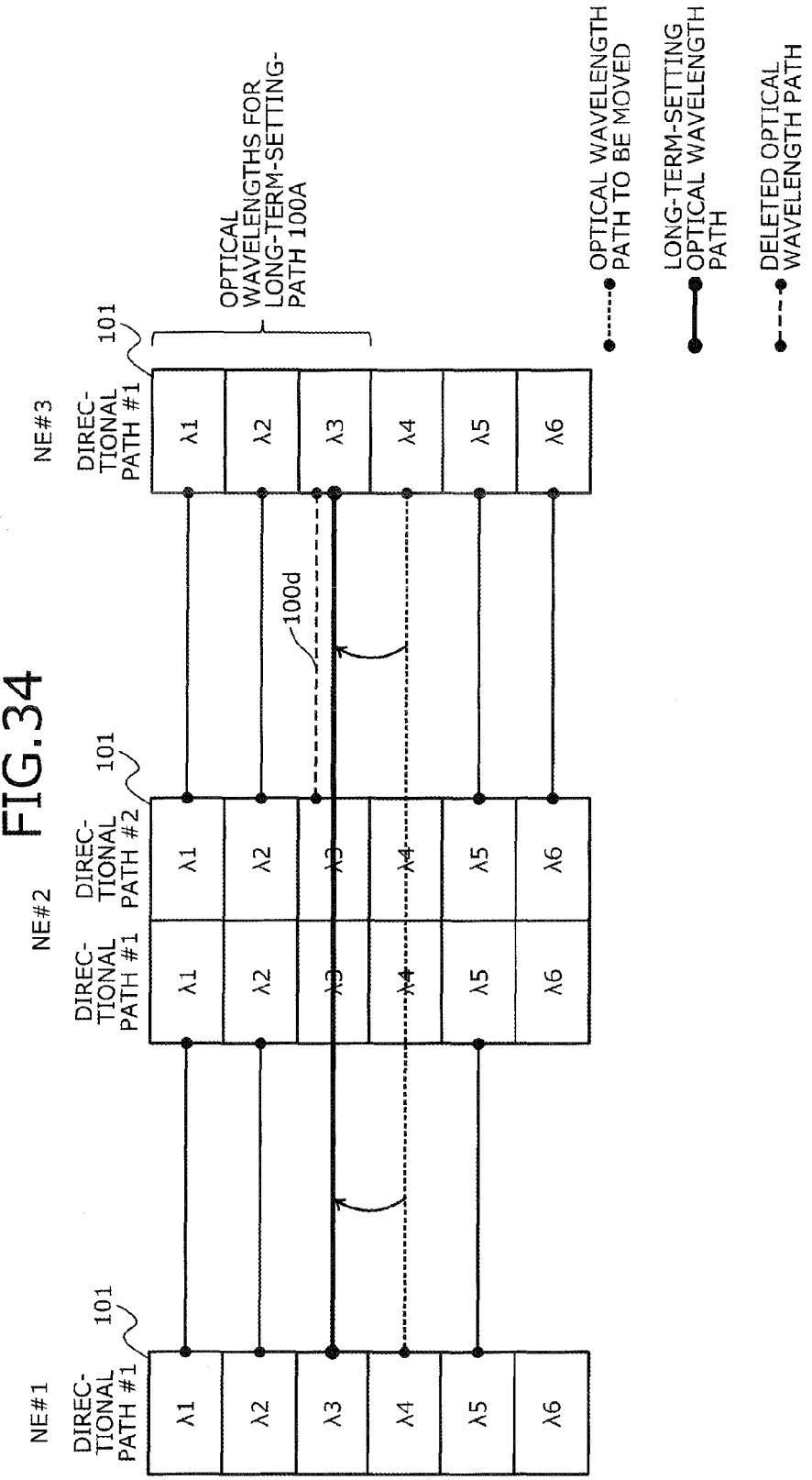

AT START OF SUSPENSION OF MOVEMENT                                    210  FIG.35AA

[NE#1] OPTICAL WAVELENGTH PATH MANAGEMENT INFORMATION                  3502   3501

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | λ3 | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVELENGTH PATH MANAGEMENT INFORMATION    3503

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Thru | 3 | λ3 | 0 | REACHED | NONE |
| 2 | 2 | λ4 | Thru | 3 | Non | 0 | REACHED | WAITING |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 2 | λ3 | Add | 2 | Non | 5 | NOT-REACHED | NONE |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVELENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| 3 | 1 | λ3 | Drop | 2 | Non | 0 | NOT-REACHED | NONE |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

AT END OF SUSPENSION

FIG.35AB

[NE#1] OPTICAL WAVE-LENGTH PATH MANAGEMENT INFORMATION 210  3506  3507

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | Non | 10 | REACHED | WAITING |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION  3505  3504

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Thru | 3 | Non | 0 | REACHED | WAITING |
| 2 | 2 | λ4 | Thru | 3 | Non | 0 | REACHED | WAITING |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 2 | λ3 | Add | 2 | Non | 5 | NOT-REACHED | NONE |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| 3 | 1 | λ3 | Drop | 2 | Non | 0 | NOT-REACHED | NONE |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

AT START OF SUSPENSION CANCELATION

FIG.35AC

[NE#1] OPTICAL WAVE-LENGTH PATH MANAGEMENT INFORMATION   210   3508

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | Non | 10 | REACHED | WAITING |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Thru | 3 | Non | 0 | REACHED | WAITING |
| 2 | 2 | λ4 | Thru | 3 | Non | 0 | REACHED | WAITING |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | 2 | λ3 | Add | 2 | Non | 0 | NOT-REACHED | NONE |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| 3 | 1 | λ3 | Drop | 2 | Non | 0 | NOT-REACHED | NONE |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

FIG. 35BD

AT SUSPENSION CANCELATION REQUEST

[NE#1] OPTICAL WAVE-LENGTH PATH MANAGEMENT INFORMATION  210  3510  3511

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ4 | Add | 3 | λ3 | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ4 | Thru | 3 | λ3 | 0 | REACHED | WAITING |
| 2 | 2 | λ4 | Thru | 3 | Non | 0 | REACHED | WAITING |
| 3 | 2 | λ1 | Add | 2 | Non | 9 | NOT-REACHED | NONE |
| 4 | 1 | λ1 | Drop | 2 | Non | 0 | NOT-REACHED | NONE |
| 5 | ~~2~~ | ~~λ3~~ | ~~Add~~ | ~~2~~ | ~~Non~~ | ~~5~~ | ~~NOT-REACHED~~ | ~~NONE~~ |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION

| OPTICAL PATH ID | DIRECTION | WAVE-LENGTH | MODE | NE COUNT | DESTINATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| 3 | ~~1~~ | ~~λ3~~ | ~~Drop~~ | ~~2~~ | ~~Non~~ | ~~0~~ | ~~NOT-REACHED~~ | ~~NONE~~ |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

AT END OF SUSPENSION CANCELATION

FIG.35BE

[NE#1] OPTICAL WAVE-LENGTH PATH MANAGEMENT INFORMATION (210)

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | λ3 | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION  3512  3513

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Thru | 3 | λ3 | 0 | REACHED | NONE |
| 2 | 2 | λ4 | Thru | 3 | λ3 | 0 | REACHED | NONE |
| 3 | 2 | λ1 | Add | 2 | Non | 9 | NOT-REACHED | NONE |
| 4 | 1 | λ1 | Drop | 2 | Non | 0 | NOT-REACHED | NONE |
| ~~5~~ | ~~2~~ | ~~λ3~~ | ~~Add~~ | ~~2~~ | ~~Non~~ | ~~5~~ | ~~NOT-REACHED~~ | ~~NONE~~ |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Drop | 3 | Non | 0 | NOT-REACHED | NONE |
| 2 | 1 | λ1 | Drop | 2 | Non | 0 | NOT-REACHED | NONE |
| ~~3~~ | ~~1~~ | ~~λ3~~ | ~~Drop~~ | ~~2~~ | ~~Non~~ | ~~0~~ | ~~NOT-REACHED~~ | ~~NONE~~ |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

FIG. 35BF

AT COMPLETION OF MOVEMENT FOR OPTIMIZATION

[NE#1] OPTICAL WAVE-LENGTH PATH MANAGEMENT INFORMATION — 210

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ4 | Add | 3 | Non | 10 | REACHED | NONE |
| 2 | 1 | λ1 | Add | 2 | Non | 8 | NOT-REACHED | NONE |
| 3 | 1 | λ5 | Add | 2 | Non | 3 | NOT-REACHED | NONE |
| 4 | 1 | λ2 | Add | 2 | Non | 2 | NOT-REACHED | NONE |
| - | - | - | - | - | - | - | - | - |

[NE#2] OPTICAL WAVE-LENGTH PATH MANAGEMENT INFORMATION

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ3 | Thru | 3 | Non | 0 | REACHED | NONE |
| 2 | 2 | λ3 | Thru | 3 | Non | 0 | REACHED | NONE |
| 3 | 2 | λ1 | Add | 2 | Non | 9 | NOT-REACHED | NONE |
| 4 | 1 | λ1 | Drop | 2 | Non | 0 | NOT-REACHED | NONE |
| ~~5~~ | ~~2~~ | ~~λ3~~ | ~~Add~~ | ~~2~~ | ~~Non~~ | ~~5~~ | ~~NOT-REACHED~~ | ~~NONE~~ |
| 6 | 1 | λ5 | Drop | 2 | Non | 0 | NOT-REACHED | NONE |
| 7 | 2 | λ5 | Add | 2 | Non | 3 | NOT-REACHED | NONE |
| 8 | 1 | λ2 | Drop | 2 | Non | 0 | NOT-REACHED | NONE |
| 9 | 2 | λ6 | Add | 2 | Non | 2 | NOT-REACHED | NONE |
| - | - | - | - | - | - | - | - | - |

[NE#3] OPTICAL WAVE-LENGTH PATH MANAGEMENT INFORMATION — 3514

| OPTICAL PATH ID | DIREC-TION | WAVE-LENGTH | MODE | NE COUNT | DESTI-NATION λ | ELAPSED TIME | LONG ELAPSED PERIOD | WAITING FOR VACANCY |
|---|---|---|---|---|---|---|---|---|
| 1 | 1 | λ3 | Drop | 3 | Non | 0 | REACHED | NONE |
| 2 | 1 | λ1 | Drop | 2 | Non | 0 | NOT-REACHED | NONE |
| ~~3~~ | ~~1~~ | ~~λ3~~ | ~~Drop~~ | ~~2~~ | ~~Non~~ | ~~0~~ | ~~NOT-REACHED~~ | ~~NONE~~ |
| 4 | 1 | λ5 | Drop | 2 | Non | 0 | NOT-REACHED | NONE |
| 5 | 1 | λ2 | Drop | 2 | Non | 0 | NOT-REACHED | NONE |
| 6 | 1 | λ6 | Drop | 2 | Non | 0 | NOT-REACHED | NONE |
| - | - | - | - | - | - | - | - | - |

OPTICAL WAVELENGTH PATH REARRANGING METHOD, COMPUTER PRODUCT, OPTICAL TRANSMISSION MANAGING APPARATUS, AND OPTICAL TRANSMISSION APPARATUS

CROSS REFERENCE TO RELATED APPLICATIONS

This application is based upon and claims the benefit of priority of the prior Japanese Patent Application No. 2013-065273, filed on Mar. 26, 2013, the entire contents of which are incorporated herein by reference.

FIELD

The embodiments discussed herein are related to an optical wavelength path rearranging method, a computer product, an optical transmission managing apparatus, and an optical transmission apparatus that rearrange optical wavelengths of optical wavelength paths.

BACKGROUND

Wavelength division multiplexing (WDM) enables high-speed, large-capacity information communication by carrying optical signals of different optical wavelengths through one optical cable at the same time. A WDM network has multiple optical transmission apparatuses (NEs: Network Elements) such as optical cross-connects (OXCs) connected to each other through communication lines, forming a network of various shapes such as linear shapes, meshes, and rings.

While communication capacity can be expanded by employing a communication mode according to WDM, diversification of services using communication lines causes the utilization states of the communication lines to frequently change. Consequent to a greater volume of data, one service may occupy a larger proportion of the communication routes. In such a situation, to ensure necessary communication routes, multiple optical wavelength paths between optical transmission apparatuses must be set individually without crossing (interference) one another.

Currently, when communication routes are optimized, a maintenance person predicts line utilization states when providing servicing and sets optimal optical wavelength paths. However, if the utilization state is different from the prediction, a central monitoring system (OpS) that manages the network moves optical wavelengths in units of optical wavelength paths.

If optical wavelength paths set in WDM signals are randomly and repeatedly set and deleted, fragmentation of the optical wavelength paths occurs in communication routes. The occurrence of the fragmentation in optical wavelengths makes it difficult to set an optical wavelength path having the same optical wavelength between multiple NEs (long path), reducing usage efficiency of WDM lines.

To avoid such fragmentation, techniques of optimizing the setting of optical wavelength paths have been disclosed (see, e.g., Japanese Laid-Open Patent Publication Nos. 2012-109928 and 2012-195787). In the technique of Japanese Laid-Open Patent Publication No. 2012-109928, the number of used optical wavelength regions is made smaller than that before rearrangement and an available optical wavelength is utilized to change an optical wavelength path to another optical wavelength path. In the technique of Japanese Laid-Open Patent Publication No. 2012-195787, optical wavelengths are rearranged such that optical signals of the same modulation mode become adjacent to one another so as to reduce the number of guard bands having a specific optical wavelength interval on the side portions of the optical signals, thereby increasing the band utilization rate.

However, when the setting of optical wavelength paths is optimized, if the communication routes of the optical wavelength paths are intricately routed in a network of increased scale, rearrangement of the optical wavelength paths without affecting other services is difficult and requires complicated control for execution and high cost for maintenance.

Particularly, no proposal has been made on a method of managing which optical wavelength path is to be rearranged (optimized) or on a technique of efficiently providing control necessary for actual rearrangement (e.g., the number of times an optical wavelength path is moved to a different optical wavelength).

SUMMARY

According to an aspect of an embodiment, an optical wavelength path rearranging method includes detecting time that elapses since a setting of optical wavelength paths in an optical wavelength division multiplexing network; and moving to a predetermined long-period optical wavelength range, an optical wavelength path that is among the optical wavelength paths and for which the detected elapsed time is long, where the optical wavelength path rearranging method is executed by a processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a chart of an example of a format of a message supplied from an OpS to an NE according to the first embodiment;

FIG. 8 is a flowchart of a process of determining a long-elapsed-period optical wavelength path according to the first embodiment;

FIG. 12 is a sequence diagram of optical wavelength path movement through message transmission/reception between the OpS and the NE according to the first embodiment;

FIG. 13 is a diagram of a state in which a predetermined optical wavelength path is moved according to the first embodiment;

FIGS. 14A and 14B are charts of settings in the optical wavelength path management information at the time of movement of the optical wavelength path according to the first embodiment;

FIG. 15 is a sequence diagram of movement after suspension of an optical wavelength path according to the first embodiment;

FIG. 16 is a diagram of a state of movement after movement suspension of the optical wavelength path according to the first embodiment;

FIGS. 17A, 17B, and 17C are charts of settings in the optical wavelength path management information that includes optical wavelength path suspension according to the first embodiment;

FIG. 31 is a diagram of a state in which a predetermined optical wavelength path is moved according to the second embodiment;

FIGS. 32A, 32B, and 32C are charts of settings in the optical wavelength path management information at the time of movement of the optical wavelength path according to the second embodiment;

FIG. 33 is a sequence diagram of movement after suspension of an optical wavelength path according to the second embodiment;

FIG. 34 is a diagram of a state of movement after movement suspension of the optical wavelength path according to the second embodiment; and FIGS. 35AA, 35AB, 35AC, 35BD, 35BE, and 35BF are charts of setting details in the optical wavelength path management information including suspension of the optical wavelength path according to the second embodiment.

DESCRIPTION OF EMBODIMENTS

Figure 1:
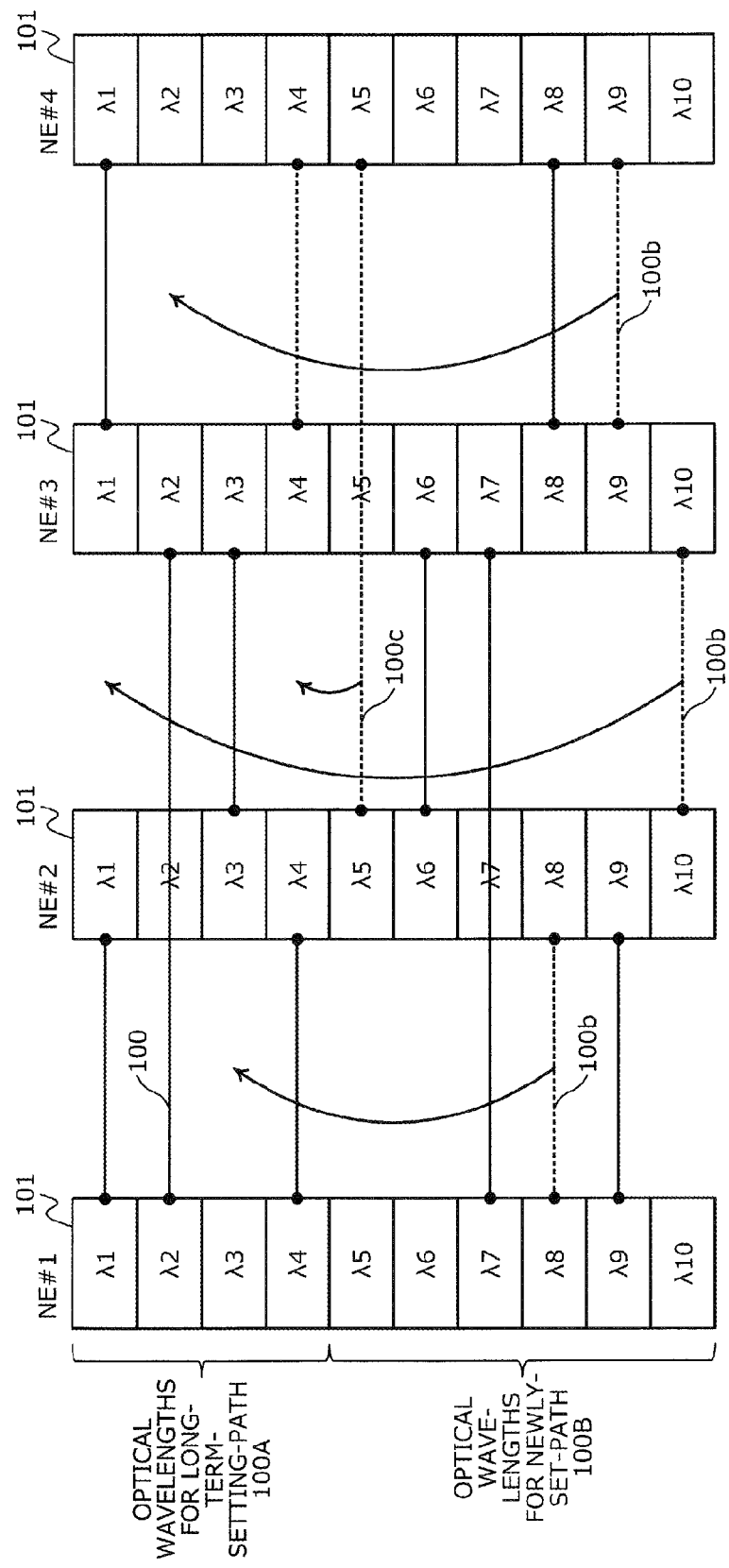
FIG. 1 is a diagram for explaining optimization of optical wavelength paths according to an embodiment.

Embodiments will be described in detail with reference to the accompanying drawings. FIG. 1 is a diagram for explaining optimization of optical wavelength paths according to an embodiment. Each optical transmission apparatus (NEs #1 to #4) 101 transmits optical signals of optical wavelengths $\lambda 1$ to $\lambda 10$. In FIG. 1, a block circle mark (●) denotes a termination (insertion or branch point) of an optical wavelength path 100. An optical wavelength path 100 passing through an optical transmission apparatus 101 (e.g., an optical wavelength path passing through NE #2 of the wavelength $\lambda 2$) allows passage (Thru) of an optical signal through the optical transmission apparatus 101 (NE #2). Each of the optical transmission apparatuses 101 (NEs #1 to #4) has a function of changing an optical wavelength of an optical signal to $\lambda 1$ to $\lambda 10$ and can change an optical wavelength of an optical wavelength path at the time of movement of the optical wavelength.

In the embodiment, the time that elapses since the setting of an optical wavelength path is managed for each optical wavelength path. The time that elapses since the setting of an optical wavelength path is measured, and an optical wavelength path (long-elapsed-period optical wavelength path) having an elapsed time that is longer than a predetermined constant period (long-setup elapsed time) is targeted for optical wavelength path optimization.

If an available optical wavelength is among long-term-setting-paths 100A of an optical wavelength range defined in advance for a long-setup path (in the example of FIG. 1, four long-term-setting-paths, including the optical wavelengths $\lambda 1$ to $\lambda 4$), the long-elapsed-period optical wavelength path is moved to this optical wavelength. In the example of FIG. 1, three optical wavelength paths 100b corresponding to the long-elapsed-period optical wavelength paths are moved to the long-term-setting-paths 100A. The determination of the movement is made by checking information concerning the optical wavelengths of the optical wavelength paths 100b and transmission sections of the optical wavelength paths against information concerning the available optical wavelengths of the long-term-setting-paths 100A and the transmission sections to determine whether the optical wavelength paths can be accommodated (moved).

Although the long-term-setting-paths 100A are brought together on the shorter wavelength side $\lambda 1$ to $\lambda 4$ in the example of FIG. 1, the optical wavelengths not only may be brought together on the shorter wavelengths but may be brought together on the longer wavelength side or dispersed to different wavelengths as long as the wavelengths are fixed in advance.

On the other hand, if the long-term-setting-path 100A is not available, the movement of the long-elapsed-period optical wavelength path to be moved is suspended until the long-term-setting-path 100A becomes available for the movement. The long-elapsed-period optical wavelength path retains information indicating that movement has been suspended. The long-elapsed-period optical wavelength path for which movement has been suspended is subsequently moved if a long-term-setting-path 100A becomes available. For example, a long-elapsed-period optical wavelength path 100c of the optical wavelength λ5 in the transmission section between NE #2 and NE #4 in FIG. 1 can be moved to the optical wavelength λ4 after deletion of an optical wavelength path of the optical wavelength λ4 in the transmission section between NE #3 and NE #4. Corresponding to the transmission sections to which the optical wavelength are moved, the optical transmission apparatuses 101 (NEs #1 to #4) change the wavelengths (Add/Thru/Drop) for transmission signals, to the post-movement wavelengths.

According to the optimization of the optical wavelength paths, the long-staying optical wavelength paths 100b are brought together to the predetermined optical wavelengths (long-term-setting-paths 100A) to prevent dispersion. As a result, optical wavelength paths that change in a short period of time can be handled by more optical wavelengths among the optical wavelengths excluding the long-term-setting-paths 100A (in the example of FIG. 1, the six optical wavelengths including the optical wavelengths λ5 to λ10). In FIG. 1, the optical wavelengths λ5 to λ10 are depicted as newly-set-path optical wavelengths 100B. The settable number of short-period optical wavelength paths that can be set to the newly-set-path optical wavelengths 100B increases and as a result, the usage efficiency of the optical wavelengths overall (λ1 to λ10 and the optical wavelengths λ1 to λ10 between NEs) can be increased.

Since the optical wavelength paths 100b having a relatively longer setup period are preferentially allocated to the predetermined optical wavelengths (long-term-setting-paths 100A), the number of times of movement is performed (changes in optical wavelength) for optimization can be reduced and improved quality can be achieved in signals during communication service. For example, in the example depicted in FIG. 1, optimization of the optical wavelength paths enables the setting of new optical wavelength paths 100 having a long path across all the optical transmission apparatuses 101 from NE #1 to NE #4 at the optical wavelengths λ5 and λ10 among the newly-set-path optical wavelengths 100B. At the optical wavelengths λ8 and λ9, new optical wavelength paths 100 can be set across multiple optical transmission apparatuses 101 (NEs).

Figures 2, 3:
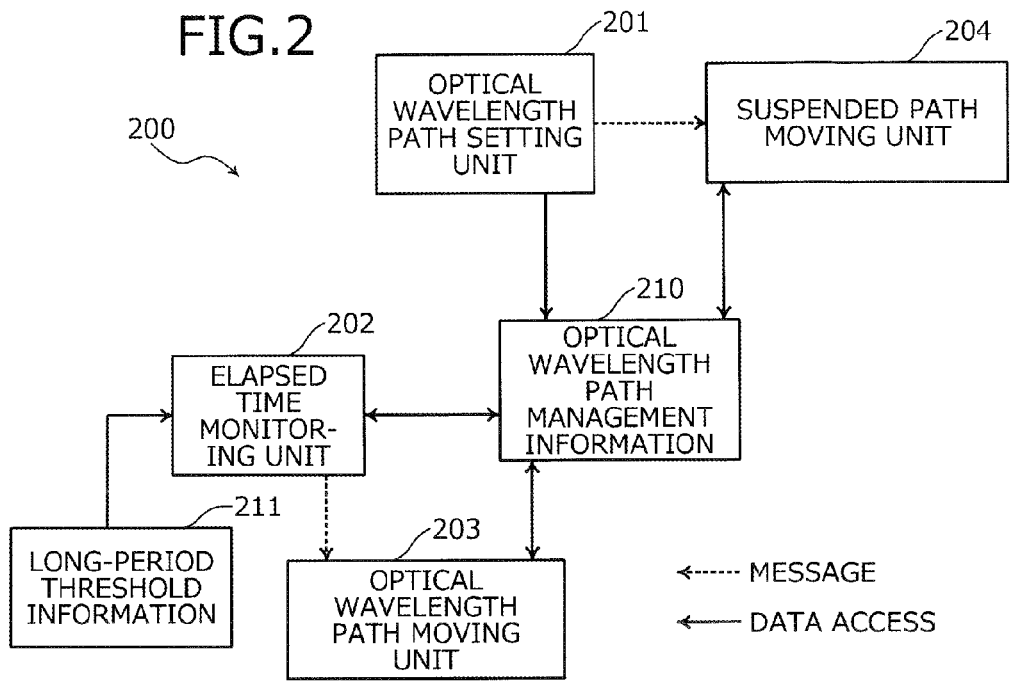
FIG. 2 is a functional block diagram for controlling optimization of the optical wavelength paths.
FIG. 3 is a chart of a data configuration of optical wavelength path management information.

FIG. 2 is a functional block diagram for controlling optimization of the optical wavelength paths. As described later, the control for optimizing optical wavelength paths can be provided through central control by an optical transmission managing apparatus such as an OpS or management by the optical transmission apparatuses (NEs #1 to #4). The functions depicted in FIG. 2 can be disposed in the optical transmission managing apparatus or the optical transmission apparatuses.

As depicted in FIG. 2, an optimization control unit 200 includes an optical wavelength path setting unit 201, an elapsed time monitoring unit (time monitoring unit) 202, an optical wavelength path moving unit (movement control unit) 203, and a suspended path moving unit (suspension control unit) 204.

If the setting of an optical wavelength path is changed, the optical wavelength path setting unit 201 updates the corresponding optical wavelength information in optical wavelength path management information 210. Setting related to the optical wavelength paths is set in an OpS 401 or is collected by the OpS 401 through communication with the optical transmission apparatuses (NEs #1 to #4) 101 and retained as a table consolidated by the OpS 401.

The elapsed time monitoring unit 202 regularly refers to a path setup elapsed time in the optical wavelength path management information 210 to monitor whether the path setup elapsed time exceeds a value of long-period threshold information 211 (long-setup elapsed time) and set for the time in advance. The elapsed time monitoring unit 202 sets an optical wavelength path that exceeds the threshold value, as a long-elapsed-period optical wavelength path. The elapsed time monitoring unit 202 transmits a message to the optical wavelength path moving unit 203 for the optical wavelength path optimization, causing the optical wavelength path moving unit 203 to execute a process.

In response to the notification of the optical wavelength path defined as the long-elapsed-period optical wavelength path, the optical wavelength path moving unit 203 determines movement to achieve optimization. The optical wavelength path moving unit 203 checks whether an optical wavelength (movement destination) is available at an optical transmission apparatus (NE) on the route of the optical wavelength path to be moved. If available, the optical wavelength path is moved. If not available, the optical wavelength path is not moved and the suspension of the movement is recorded in the optical wavelength path management information 210.

If an optical wavelength path set in the long-term-setting-path 100A is deleted, the suspended path moving unit 204 manages the suspension of the optical wavelength path. The suspended path moving unit 204 detects a vacancy for the long-elapsed-period optical wavelength path of the suspended movement and requests the optical wavelength path moving unit 203 to move the suspended long-elapsed-period optical wavelength path when a vacancy occurs.

FIG. 3 is a chart of a data configuration of optical wavelength path management information. The optical wavelength path management information 210 has parameters set as "optical wavelength path ID", "optical wavelength path route information", "elapsed time", "long elapsed period", and "waiting for vacancy". The "optical wavelength path ID" is an ID specified when a maintenance person manages an optical wavelength path. The "optical wavelength path route information" is information for determining a route of a set optical wavelength path and the necessary information is different between the optical transmission managing apparatus (OpS) and the optical transmission apparatus (NE). The following information is retained: OpS: optical wavelength, insertion node ID (Add Node ID), passage node ID (Thru Node ID (1 ... n)), and branch node ID (Drop Node ID); and NE: directional path, optical wavelength, mode (Add/Drop/Thru), route NE number, and movement destination optical wavelength (λ).

The "elapsed time" is information that indicates the elapsed time since the setting of an optical wavelength path and is for determining whether the optical wavelength path is a path set for a long period. If path setting is "Add", time monitoring is performed. In the case of "Thru" or "Drop", time monitoring is not performed and therefore, the initial value (0) does not change. The "long elapsed period" is updated if it is determined that an optical wavelength path has been continuously set for a long period. If the path setting is "Thru" or "Drop", the "long elapsed period" is set in conjunction with the optical transmission apparatus (Add NE) at an insertion position on the route. The setting values are as follows: "not-reached": a value indicative of a case of less than a given period (initial value); and "reached": a value indicative of a case of equal to or greater than the given period.

The "waiting for vacancy" indicates that the movement for achieving optimization has been suspended due to the absence of a vacancy for a long-elapsed-period optical wavelength path at the movement destination when an optical wavelength path is to be moved for optimization. The setting values are as follows:

"none": a value indicative of the absence of suspended movement (initial value); and "suspended": a value indicative of the presence of suspended movement.

Figure 4:
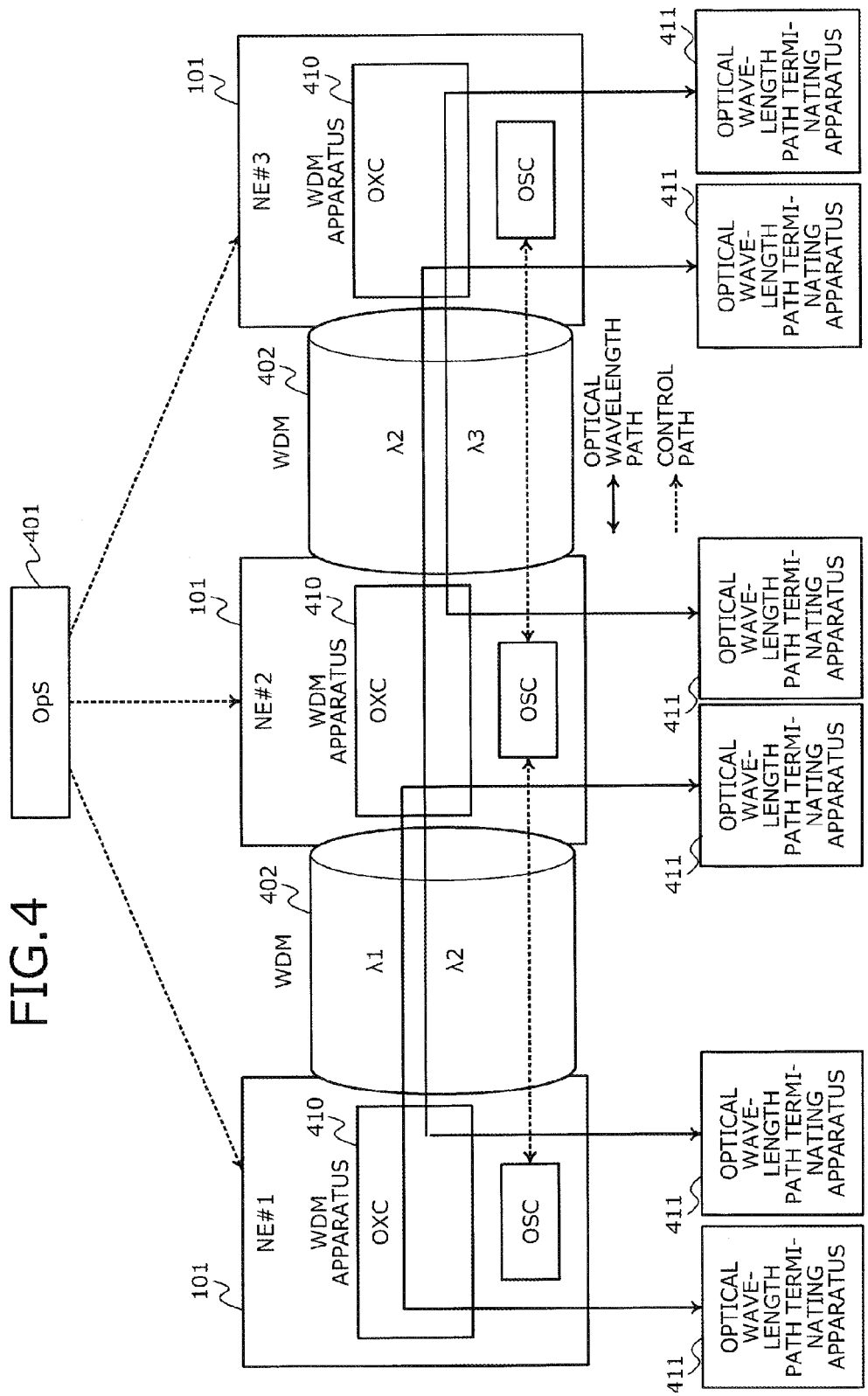
FIG. 4 is a diagram of a network configuration for implementing optimization of optical wavelength paths according to a first embodiment.

FIG. 4 is a diagram of a network configuration for implementing optimization of optical wavelength paths according to a first embodiment. The first embodiment will be described in terms of the optimization of optical wavelength paths in a WDM network by an OpS.

As depicted in FIG. 4, three NEs (#1 to #3) 101 are connected through a WDM line 402 in a linear configuration. Each of the NEs 101 has an optical cross-connecting unit (OXC) 410 and multiplexes and transmits to another NE 101, optical signals adjusted to optical wavelengths of the WDM. In FIG. 4, a solid line indicates an optical wavelength path and optical wavelength path terminating apparatuses 411 terminate the optical wavelength paths. For example, the optical wavelength path of the optical wavelength λ1 is set between the NE #1 and the NE #2.

With regard to the optimization of optical wavelength paths, the optical transmission managing apparatus (OpS) 401 makes a determination and gives to the NEs 101, instructions for movement of optical wavelength paths to achieve optimization. In FIG. 4, dotted lines indicate control paths connecting the OpS 401 to the NEs 101. The NEs 101 also exchange control information with one another by using a monitoring signal (Optical Supervisor Channel (OSC)) such as a wavelength different from a main signal (transmission signal).

Figure 5:
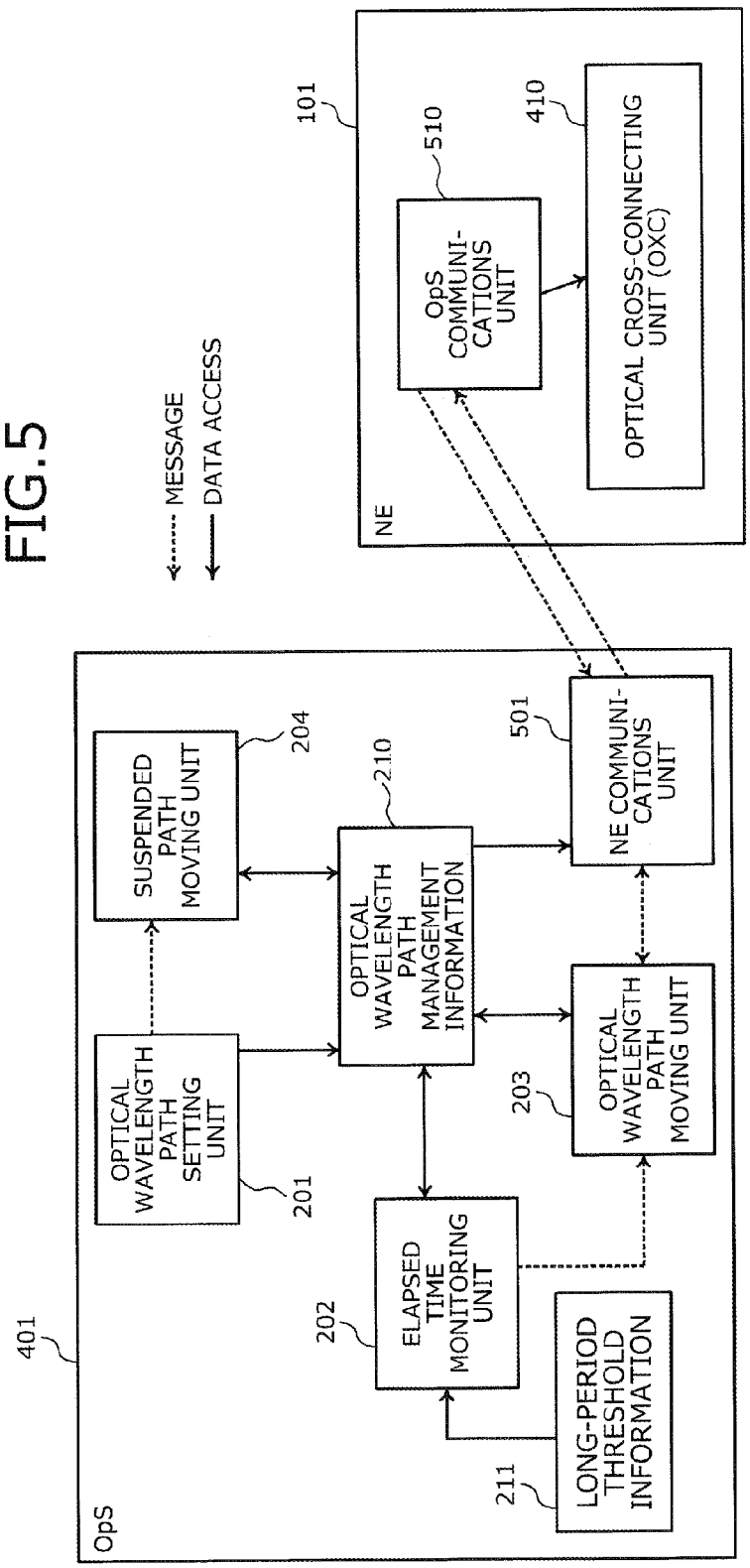
FIG. 5 is a block diagram of functions of an optical transmission managing apparatus and an optical transmission apparatus according to the first embodiment.

FIG. 5 is a block diagram of functions of the optical transmission managing apparatus and the optical transmission apparatus according to the first embodiment. Among the functions depicted in FIG. 5, functions identical to those depicted in FIG. 2 are denoted by the same reference numerals used in FIG. 2. The control related to the optimization of the optical wavelength paths is entirely provided by the optical transmission managing apparatus (OpS) 401. The OpS 401 has an NE communications unit 501 and the NE 101 has an OpS communications unit 510. The OpS 401 instructs the NE 101 to move an optical wavelength path and the NE 101 moves the optical wavelength path.

Figure 6:
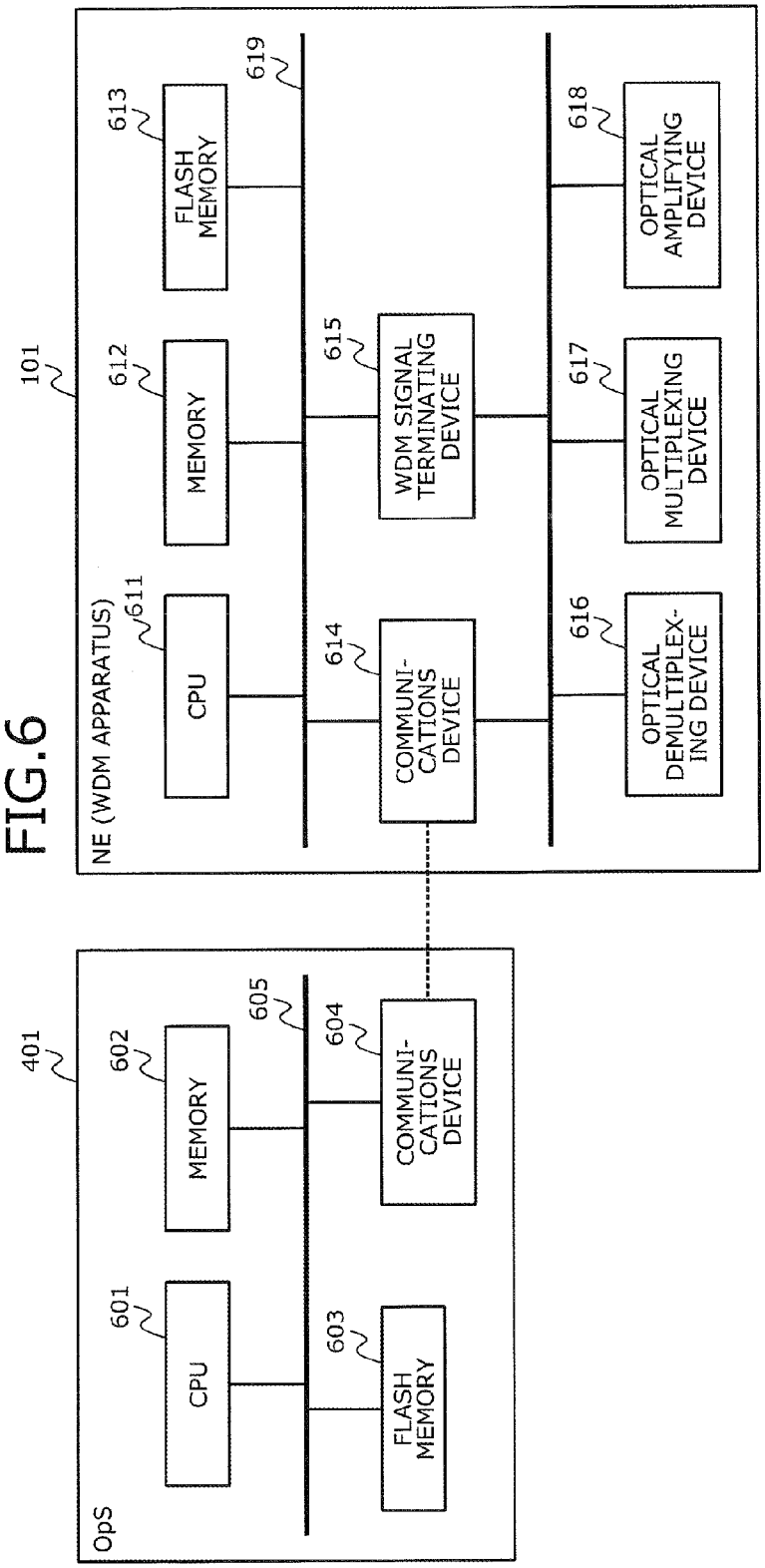
FIG. 6 is a block diagram of a hardware configuration of the optical transmission managing apparatus and the optical transmission apparatus according to the first embodiment.

FIG. 6 is a block diagram of a hardware configuration of the optical transmission managing apparatus and the optical transmission apparatus according to the first embodiment. The OpS 401 includes a central processing unit (CPU) 601 acting as a control unit, memory 602, flash memory 603, and a communications device 604.

The CPU 601 provides control of managing optical transmission, based on a control program stored in the memory 602, etc. and also provides control related to the optical wavelength path optimization. The flash memory 603 stores setting values (parameters) necessary for the optimization. The communications device 604 is made up of a communication I/F card, etc. and communicates with the NE 101. The CPU 601 to the communications device 604 are connected through a bus 605.

Functions of the optical wavelength path setting unit 201, the elapsed time monitoring unit 202, the optical wavelength path moving unit 203, and the suspended path moving unit 204 depicted in FIG. 5 are obtained when the CPU 601 depicted in FIG. 6 executes the control program. The NE communications unit 501 depicted in FIG. 5 may be configured by the communications device 604 depicted in FIG. 6.

The optical transmission device 101 includes a CPU 611, memory 612, flash memory 613, a communications device 614, a WDM signal terminating device 615, an optical demultiplexing device 616, an optical multiplexing device 617, and an optical amplifying device 618.

The CPU 611 provides control for optical transmission, based on a control program stored in the memory 612, etc. Based on the control from the OpS 401, the CPU 611 controls the movement, etc. of an optical wavelength path related to optical wavelength path optimization. The memory 612 and the flash memory 613 store setting values (the optical wavelength path management information 210), etc. necessary at the time of movement of an optical wavelength path. The communications device 614 is made up of a communication I/F card, etc. and communicates with the OpS 401.

The optical transmission apparatus 101 uses the WDM signal terminating device 615, the optical demultiplexing device 616, and the optical multiplexing device 617 to insert and branch the optical wavelength paths in the optical transmission apparatus 101 and, to set and move the optical wavelength paths. The optical amplifying device 618 optically amplifies an optical signal transmitted over long distance.

FIG. 7 is a chart of an example of a format of a message supplied from the OpS to the NE according to the first embodiment. Description will be made of an example of a message for optical wavelength path movement control from the OpS 401 to the NE 101 and for a response to the movement control from the NE 101. A movement control message 701 includes a "message type", a "response type", a "movement object directional path", a "movement source optical wavelength", and a "movement destination optical wavelength". The "message type" is set to "request" or "response". The "response type" is set to "successful (OK)" or "failed (NG)" when the message type is "response". The "movement object directional path" is set to a directional path to which an optical wavelength path to be moved is set. The "movement source optical wavelength" is set to the optical wavelength λ of the optical wavelength path that is to be moved. The "movement destination optical wavelength" is set to the optical wavelength λ to which the optical path is to be moved.

An optical wavelength path optimization process according to the first embodiment will be described. FIG. 8 is a flowchart of a process of determining a long-elapsed-period optical wavelength path according to the first embodiment. A process executed by the elapsed time monitoring unit 202 of the OpS 401 by using a timer interrupt will be described.

The elapsed time monitoring unit 202 refers to the "long elapsed period" in the optical wavelength path management information 210 for each periodic timer interrupt of a constant period (step S801). If the "long elapsed period" indicates "not-reached" (step S802: not-reached), the process proceeds to step S803 and in the case of "reached" (step S802: reached), the timer is restarted without performing processing.

At step S803, the elapsed time monitoring unit 202 increments the "elapsed time" in the optical wavelength path management information 210 (step S803) and performs a comparison to determine whether the elapsed time in the optical wavelength path management information 210 is greater than a value of the long-period threshold information 211 (long-setup elapsed time) (step S804). If the elapsed time in the optical wavelength path management information 210 is greater than a value of the long-period threshold information 211 (step S805: YES), the process proceeds to step S806, and if not (step S805: NO), the timer is restarted without performing processing.

At step S806, the elapsed time monitoring unit 202 sets the "long elapsed period" in the optical wavelength path management information 210 to "reached" (step S806), and requests the optical wavelength path moving unit 203 to move the long-elapsed-period optical wavelength path (step S807). The timer is then restarted.

Figure 9:
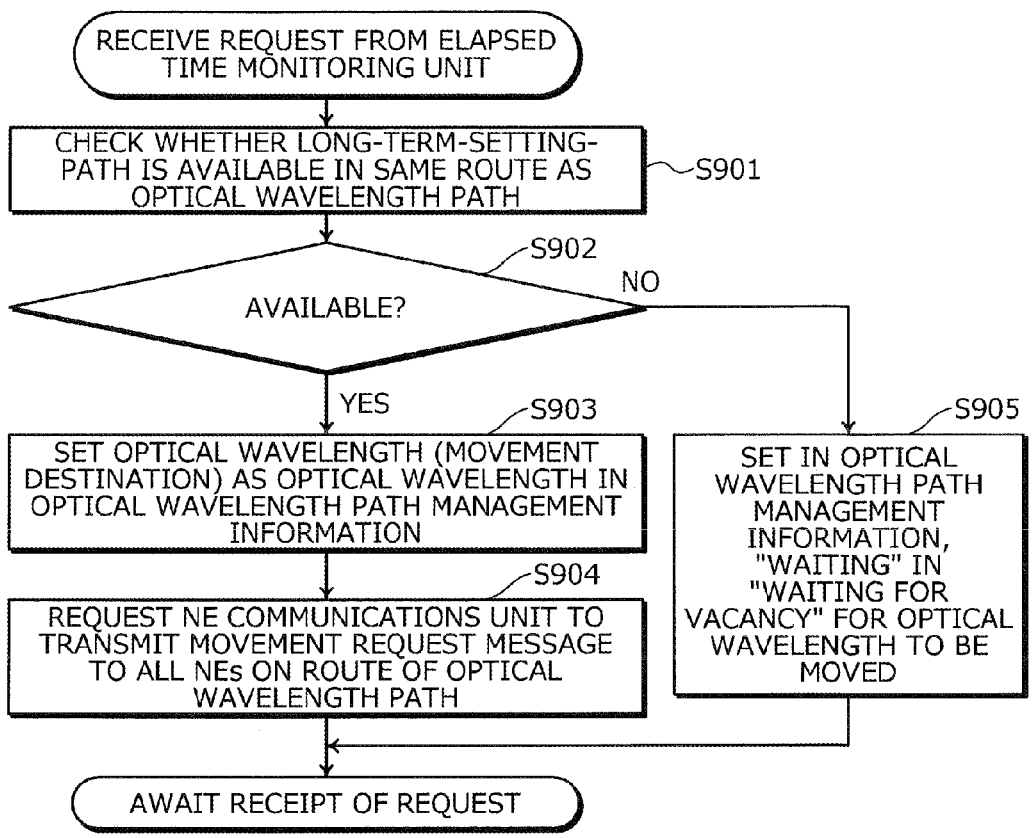
FIG. 9 is a flowchart of a process of starting optical wavelength path movement according to the first embodiment.

FIG. 9 is a flowchart of a process of starting optical wavelength path movement according to the first embodiment. A process executed by the optical wavelength path moving unit 203 will be described. The optical wavelength path moving unit 203 of the OpS 401 receives from the elapsed time monitoring unit 202, a movement request for a long-elapsed-period optical wavelength path and executes the following process.

First, the optical wavelength path moving unit 203 checks whether a long-term-setting-path 100A is available in the same route as the optical wavelength path of the movement source (step S901). If a long-term-setting-path 100A is available (step S902: YES), the optical wavelength path moving unit 203 proceeds to step S903; and if not available (step S902: NO), the optical wavelength path moving unit 203 proceeds to step S905.

At step S903, the optical wavelength path moving unit 203 sets the optical wavelength of the movement destination as the optical wavelength in the optical wavelength path management information 210 (step S903) and requests the NE communications unit 501 to transmit a movement request message to all the NEs (NEs #1 to #3 of FIG. 4) 101 on the route of the optical wavelength path (step S904). The optical wavelength path moving unit 203 then waits for the next request.

At step S905, since it is determined that the optical wavelength path cannot be moved, the optical wavelength path moving unit 203 sets in the optical wavelength path management information 210, "waiting" in the "waiting for vacancy" for the optical wavelength to be moved (step S905) and waits for the next request.

Figure 10:
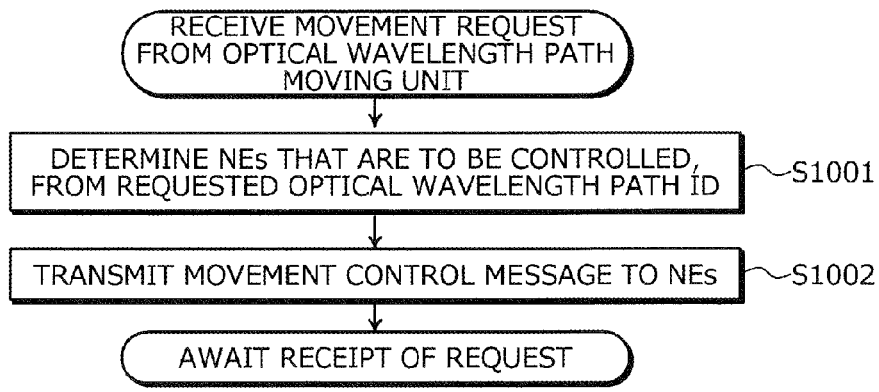
FIG. 10 is a flowchart of a process for an optical wavelength path movement request from the OpS to the NE according to the first embodiment.

FIG. 10 is a flowchart of a process for an optical wavelength path movement request from the OpS to the NE according to the first embodiment. A process executed by the NE communications unit 501 of the OpS 401 will be described. First, the NE communications unit 501 determines the NEs 101 that are to be controlled, from the optical wavelength path ID requested from the optical wavelength path moving unit 203 (step S1001). In this case, the NEs 101 to be controlled are determined by referring to the insertion (Add) node, the passage (Thru) nodes (1) . . . (n), and the branch (Drop) node of the optical wavelength path ID in the optical wavelength path management information 210. The NE communications unit 501 transmits a movement control message to the NEs that are to be controlled (step S1002) and waits for the next request.

Figure 11:
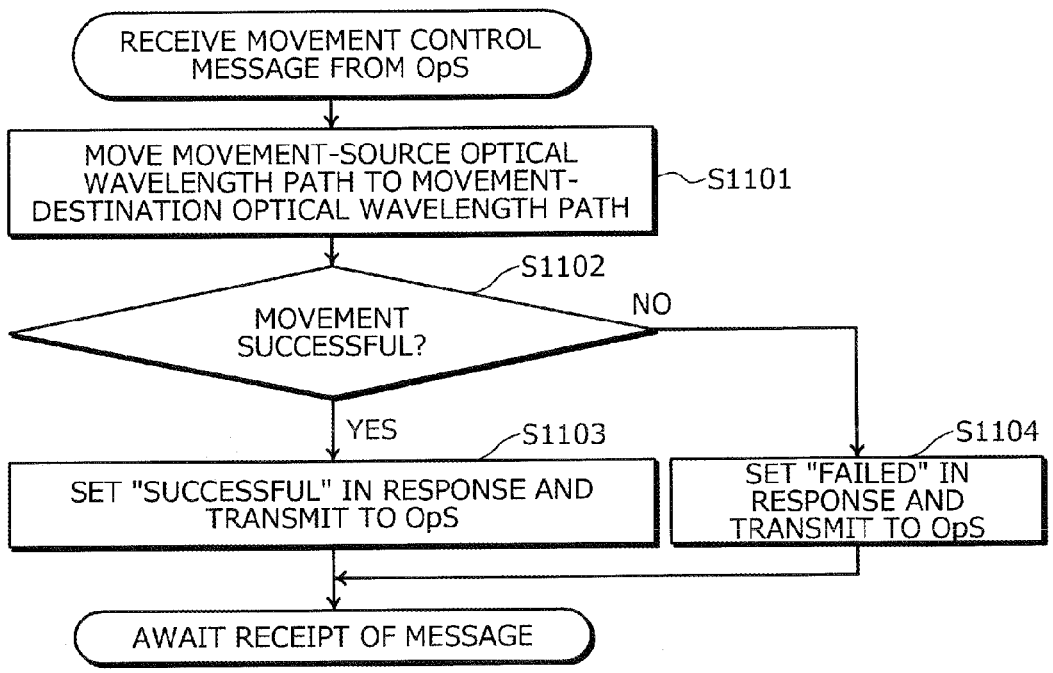
FIG. 11 is a flowchart of optical wavelength path movement control at the NE according to the first embodiment.

FIG. 11 is a flowchart of optical wavelength path movement control at the NE according to the first embodiment. In response to the movement control message received by the OpS communications unit 510 of the NE 101, the NE 101 changes an optical wavelength via the optical cross-connecting unit 410 to move the optical wavelength path. In other words, in terms of the order of processing, when the OpS communications unit 510 of the NE 101 receives the movement control message from the OpS 401, the optical cross-connecting unit 410 moves the optical wavelength path of the movement source to the optical wavelength path of the movement destination (step S1101).

If the movement of the optical wavelength path is successful (step S1102: YES), the NE 101 proceeds to step S1103, and if not successful (step S1102: NO), the NE 101 proceeds to step S1104. At step S1103, a response concerning the movement control is set to "successful" and transmitted to the OpS 401 (step S1103). At step S1104, a response concerning the movement control is set to "failed" and transmitted to the OpS 401 (step S1104). After transmission at step S1103 or step S1104, the NE 101 waits for the next request.

FIG. 12 is a sequence diagram of optical wavelength path movement through message transmission/reception between the OpS and the NE according to the first embodiment. As depicted in FIG. 12, if a given optical wavelength path is determined as a long-elapsed-period optical wavelength path at the OpS 401 (step S1201), a movement request is transmitted to the NEs #1 to #3 (101) on the route of the optical wavelength path (step S1202). Each of the NEs #1 to #3 (101) on the route performs movement to the optical wavelength specified as the movement destination (step S1203). Each of the NEs #1 to #3 (101) transmits a result "successful/failed" concerning the movement of the optical wavelength as a response to the movement request to the OpS 401 (step S1204). Base on the responses, the OpS 401 updates the optical wavelength path management information 210 (step S1205).

FIG. 13 is a diagram of a state in which a predetermined optical wavelength path is moved according to the first embodiment. As depicted in FIG. 13, when the optical wavelength path of the optical wavelength λ4 (terminated by the NEs #1 and #3; the NE #2 is Thru) becomes a long-elapsed-period optical wavelength path and the optical wavelength λ3 among the long-term-setting-paths 100A is available, the optical wavelength path is moved by changing the optical wavelength from λ4 to λ3.

FIGS. 14A and 14B are charts of settings in the optical wavelength path management information at the time of movement of the optical wavelength path according to the first embodiment. FIGS. 14A and 14B depict settings in the optical wavelength path management information at the time of movement of the optical wavelength path depicted in FIG. 13. FIG. 14A depicts the optical wavelength path management information 210 at the time of start of movement of the optical wavelength path for optimization, while FIG. 14B depicts the optical wavelength path management information 210 at the time of completion of the movement.

At the start of the movement for optimization depicted in FIG. 14A, since an elapsed time 1401 for the optical wavelength path of the wavelength λ4 between the NEs #1 and #3 (101) has reached a threshold value ("10 hours" in the example of FIG. 14A) for the long elapsed time, the elapsed time monitoring unit 202 of the OpS 401 determines that this optical wavelength path is a long-elapsed-period optical wavelength path and sets a long elapsed period 1402 in the optical wavelength path management information 210 to "reached".

The optical wavelength path moving unit 203 searches for an available long-term-setting-path (λ1 to λ3), determines that the optical wavelength λ3 is available, and therefore, specifies the movement source optical wavelength as λ4 and the movement destination optical wavelength as λ3. The OpS 401 notifies each of the NE #1, the NE#2, and the NE #3 (101) of the movement control message through a message between the OpS 401 and the NEs #1, #2, and #3 (101).

Subsequently, as depicted in FIG. 14B, at the time of completion of the movement for optimization, when successful at switching the wavelength from λ4 to λ3, the NE #1, the NE#2, and the NE #3 (101) return "successful" to the OpS 401 as a response to the movement control. As a result, the OpS 401 receives "successful" as the response to the movement control and therefore, changes an optical wavelength 1403 of the optical wavelength path ID in the optical wavelength path management information 210 from the optical wavelength λ4 to the optical wavelength λ3, which is the movement destination.

FIG. 15 is a sequence diagram of movement after suspension of an optical wavelength path according to the first embodiment. If no movement destination exists for a long-elapsed-period optical wavelength path, the OpS 401 suspends the movement of the optical wavelength (step S1501).

The OpS 401 subsequently exchanges a movement control message 701 between the OpS 401 and the NE 101 to move the optical wavelength path in a synchronized manner. In this case, when a long-term-setting-path 100A becomes available, the OpS 401 resumes the control of the movement (step S1502). The OpS 401 transmits a movement request to the NEs #1 to #3 (101) on the route of the optical wavelength path (step S1503). Each of the NEs #1 to #3 (101) on the route performs movement to the optical wavelength specified as the movement destination (step S1504). Each of the NEs #1 to #3 (101) transmits to the OpS 401, a result "successful/failed" concerning the movement of the optical wavelength, as a response to the movement request (step S1505).

FIG. 16 is a diagram of a state of movement after movement suspension of the optical wavelength path according to the first embodiment. As depicted in FIG. 16 it is assumed that all the wavelengths λ1 to λ3 among the long-term-setting-paths 100A are being used and are unavailable. In this case, even when the optical wavelength path of the optical wavelength λ4 (terminated by the NEs #1 and #3; the NE #2 is Thru) becomes a long-elapsed-period optical wavelength path, movement to a long-term-setting-path 100A cannot be performed and the movement state is suspended.

It is assumed that a vacancy subsequently occurs because the optical wavelength path (terminated by the NEs #2 and #3) 100d of the optical wavelength λ3 among the long-term-setting-paths 100A is deleted. As a result, the suspended optical wavelength path of the optical wavelength λ4 can be moved to the wavelength λ3.

FIGS. 17A, 17B, and 17C are charts of settings in the optical wavelength path management information that includes optical wavelength path suspension according to the first embodiment. FIGS. 17A to 17C depict settings in the optical wavelength path management information from the suspension of, to the completion of the movement of the optical wavelength path depicted in FIG. 16. FIG. 17A depicts the optical wavelength path management information 210 at the start of suspension of the movement of the optical wavelength path for optimization; FIG. 17B depicts the optical wavelength path management information 210 at the time of cancellation of suspension of the movement of the optical wavelength path for optimization; and FIG. 17C depicts the optical wavelength path management information 210 at the time of completion of the movement.

As depicted in FIG. 17A, at the start of suspension of the movement for optimization, since an elapsed time 1701 for the optical wavelength path of the wavelength λ4 between the NEs #1 and #3 (101) reaches the threshold value (e.g., "10 hours"), the elapsed time monitoring unit 202 of the OpS 401 determines that this optical wavelength path is a long-elapsed-period optical wavelength path and sets a long elapsed period 1702 to "reached". However, after searching for an available long-term-setting-path (λ1 to λ3) between the NEs #1 and #3 (101), the optical wavelength path moving unit 203 determines that no vacancy exists and therefore, sets "waiting" in waiting for vacancy 1703 of λ4 in the optical wavelength path management information 210.

With regard to the cancellation of suspension of the movement for optimization depicted in FIG. 17B, it is assumed that the optical wavelength path of the optical wavelength λ3 between the NE #2 and the NE #3 is deleted as depicted in FIG. 16. To check for the presence of a suspended long-elapsed-period optical wavelength path, the suspended path moving unit 204 searches for "waiting" set in the waiting for vacancy. Since "waiting" is set in the waiting for vacancy 1703 for the optical wavelength λ4 (optical wavelength path ID=1) in the optical wavelength path management information, the optical wavelength path moving unit 203 confirms that the movement destination optical wavelength λ3 is available for the entire route of the movement source optical wavelength λ4 (optical wavelength path route information 1704). The optical wavelength path moving unit 203 then transmits to the NE #1, the NE #2, and the NE #3 (101), control for moving the optical wavelength path of the wavelength λ4 to the wavelength λ3. The NEs #1 to #3 receive this instruction and move the wavelength λ4 to the wavelength λ3.

As depicted in FIG. 17C, at the time of completion of the movement for optimization, if successful at switching the wavelength λ4 to the wavelength λ3, the NEs #1 to #3 (101) return "successful" to the OpS 401 as a response to the movement request. The OpS 401 receives "successful" as a response to the movement request and therefore, in the optical wavelength path management information 210, changes an optical wavelength 1705 in the information from the wavelength λ4 (optical wavelength path ID=1) to the optical wavelength λ3, which is the movement destination.

According to the first embodiment described above, based on the elapsed time of the optical wavelength paths of the optical transmission apparatuses 101 on the transmission path, the OpS 401 performs the optical wavelength movement of a long-elapsed-period optical wavelength path having the long elapsed time to a long-term-setting-path 100A within the predetermined optical wavelength range. Even if the long-elapsed-period optical wavelength path having a long elapsed time cannot be moved immediately, the movement-suspended state is maintained and the movement is performed as soon as a corresponding optical wavelength becomes available. As a result, the OpS 401 can centrally manage the optical transmission apparatuses 101 and bring the long-elapsed-period optical wavelength paths used for a long period together in the predetermined long-term-setting-paths 100A to prevent dispersion, thereby eliminating the fragmentation of the unused areas of the optical wavelength paths in WDM transmission using multiple wavelengths.

Figure 18:
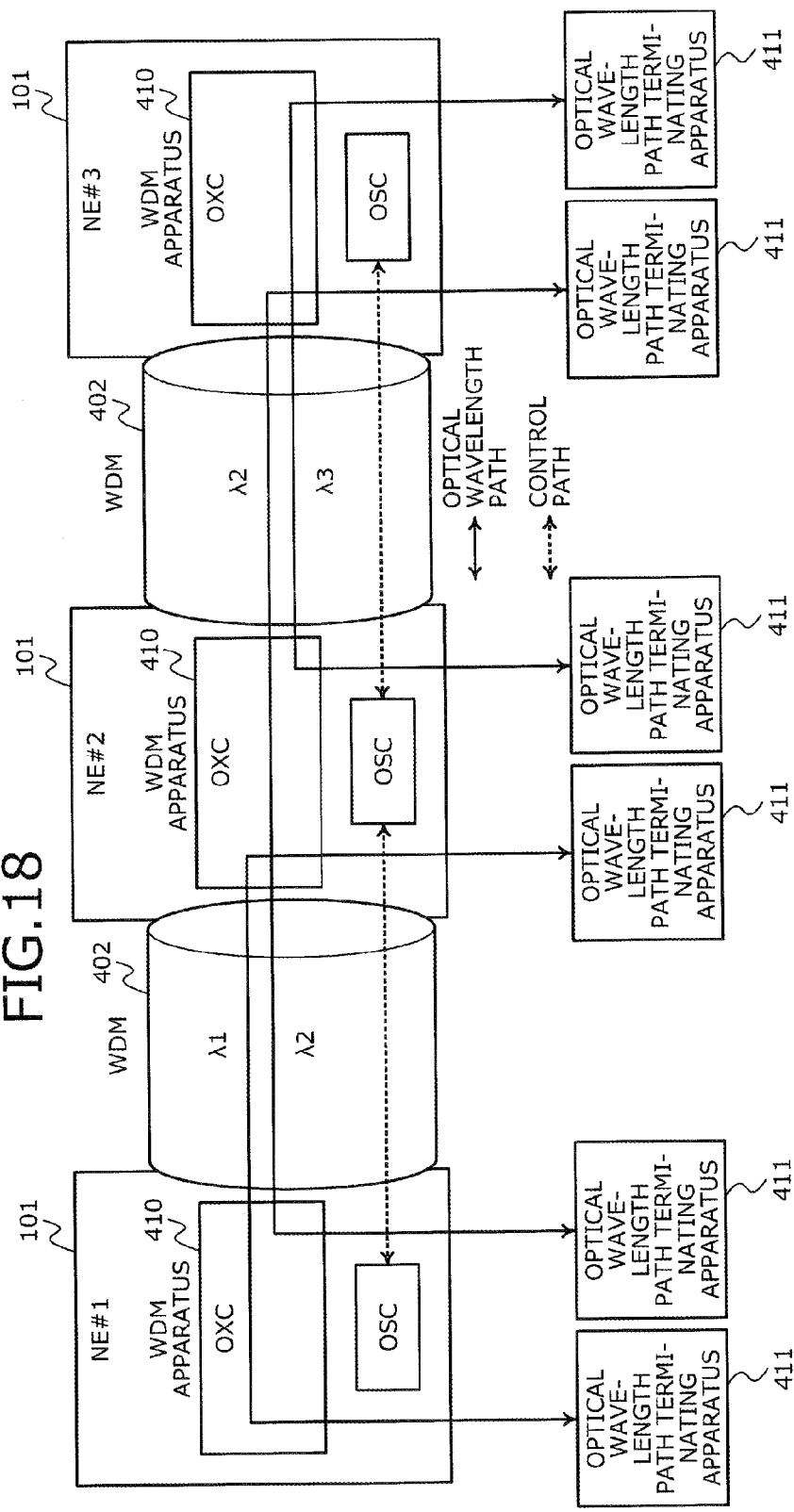
FIG. 18 is a diagram of a network configuration for implementing optimization of optical wavelength paths according to a second embodiment.

FIG. 18 is a diagram of a network configuration for implementing optimization of optical wavelength paths according to a second embodiment. The second embodiment will be described in terms of the optimization of optical wavelength paths in a WDM network by the NE. In the second embodiment, the OpS does not control the optimization of optical wavelength paths and the NE 101 autonomously controls the optimization of optical wavelength paths.

As depicted in FIG. 18, three NEs (#1 to #3) 101 are connected through a WDM line 402 in a linear configuration. Each of the NEs 101 has an optical cross-connecting unit (OXC) 410 and multiplexes and transmits to another NE 101, optical signals adjusted to optical wavelengths of WDM. In FIG. 18, a solid line indicates an optical wavelength path and optical wavelength path terminating apparatuses 411 terminate the optical wavelength paths. For example, the optical wavelength path of the optical wavelength λ1 is set between the NE #1 and the NE #2.

For the optimization of optical wavelength paths, each of the optical transmission apparatuses (NEs) 101 moves the optical wavelength paths in synchronization with the other NEs 101 in the WDM network. The NEs #1 to #3 (101) use a monitoring signal OSC for control information when controlling the optical wavelength paths in a synchronized manner.

Figure 19:
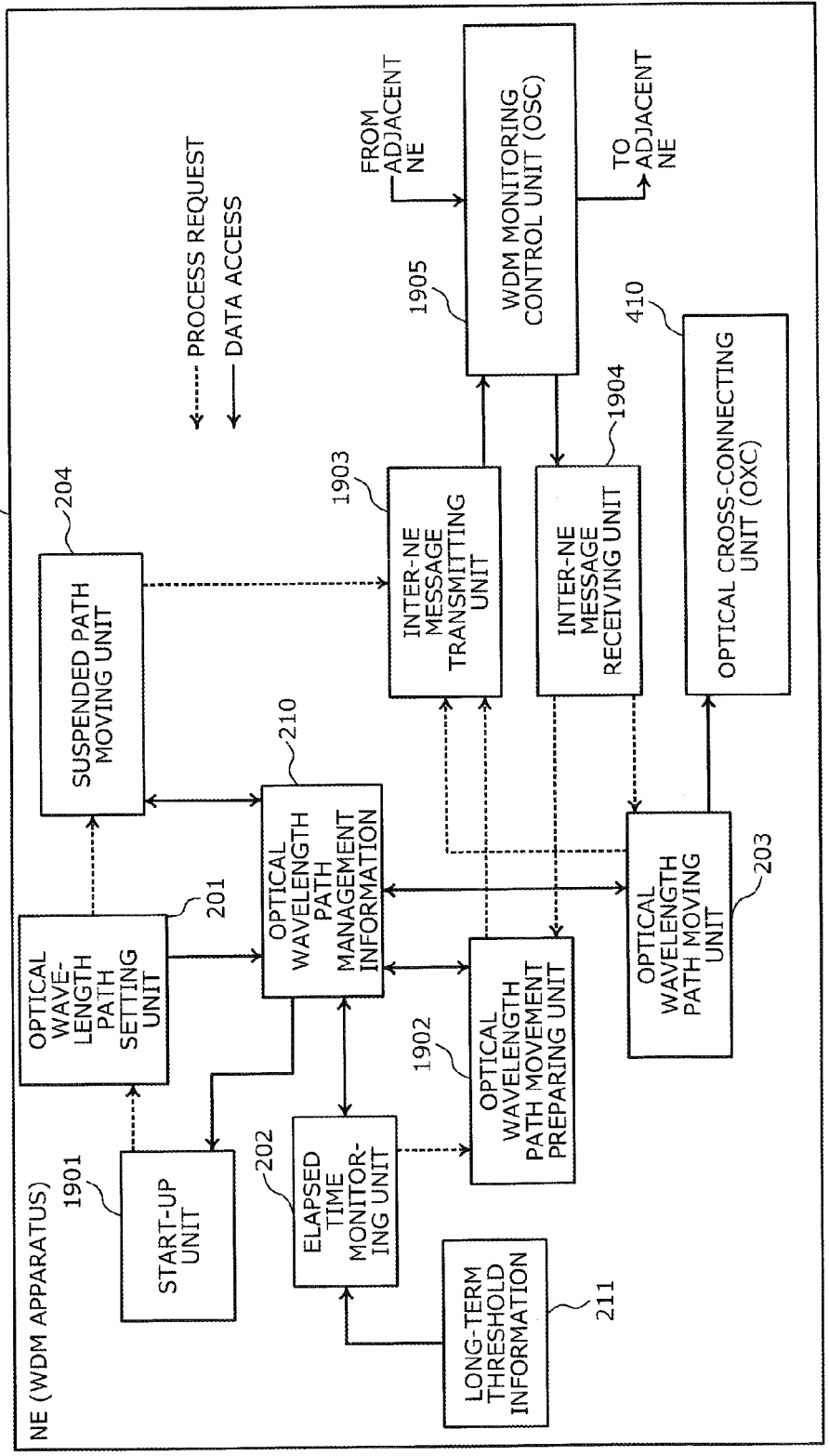
FIG. 19 is a block diagram of functions of the optical transmission apparatus according to the second embodiment.

FIG. 19 is a block diagram of functions of the optical transmission apparatus according to the second embodiment. Among the functions of FIG. 19, functions identical to those depicted in FIG. 2 are denoted by the same reference numerals used in FIG. 2. The control related to the optimization of the optical wavelength paths depicted in FIG. 2 is provided entirely by the optical transmission apparatus (NE) 101.

In addition to the functions depicted in FIG. 2, this NE 101 has a start-up unit 1901 that confirms consistency with the other NEs 101 in the WDM network at the start-up of the NE 101. The NE 101 also includes an optical wavelength path movement preparing unit 1902 that prepares movement of an optical wavelength path by referring to the optical wavelength path management information 210 at the time of a movement request for the optical wavelength path, an inter-NE message transmitting unit 1903 that transmits messages to the other NEs 101, an inter-NE message receiving unit 1904 that receives messages from the other NEs 101, and a WDM monitoring control unit 1905 for exchanging messages by using OSCs with the other NEs 101, etc.

Figures 20, 21A, 21B:
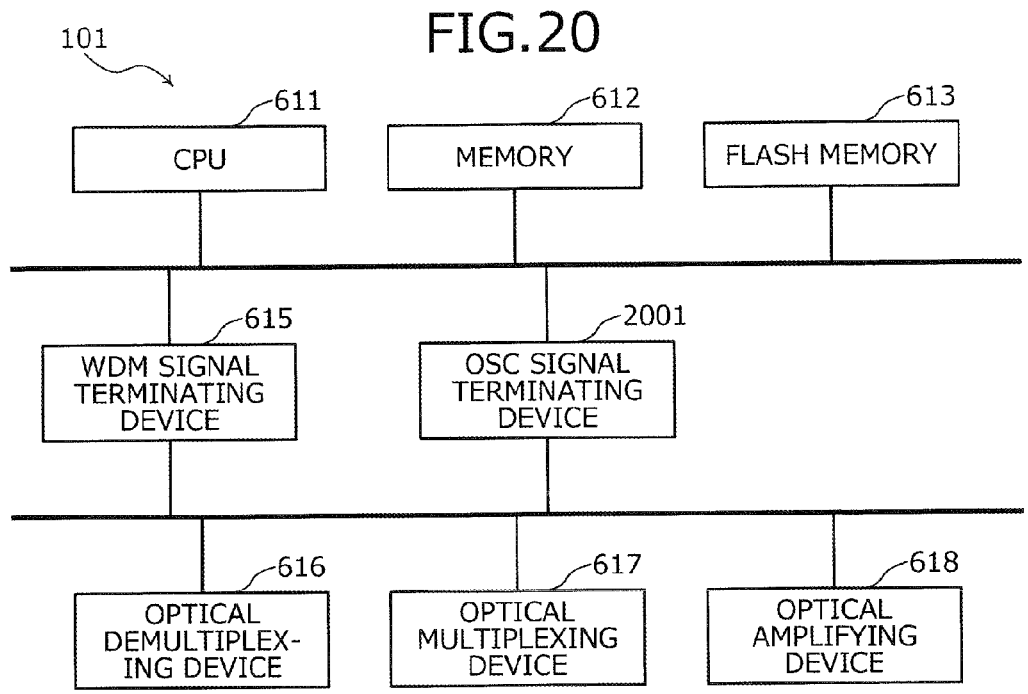
FIG. 20 is a block diagram of a hardware configuration example of the optical transmission apparatus according to the second embodiment.
FIGS. 21A and 21B are charts of an example of a format of a message between NEs according to the second embodiment.

FIG. 20 is a block diagram of a hardware configuration example of the optical transmission apparatus according to the second embodiment. As is the case with the NE 101 depicted in FIG. 6, the NE 101 includes the CPU 611, the memory 612, the flash memory 613, the WDM signal terminating device 615, the optical demultiplexing device 616, the optical multiplexing device 617, and the optical amplifying device 618. In the second embodiment, the NE 101 additionally includes an OSC signal terminating device 2001 that transmits/receives control information (OSC signal) for synchronizing the movement of an optical wavelength path between NEs 101.

FIGS. 21A and 21B are charts of an example of a format of a message between the NEs according to the second embodiment. FIGS. 21A and 21B depict a movement request message exchanged for synchronization among the NEs 101 in the WDM network when a long-elapsed-period optical wavelength path is moved.

As depicted in FIG. 21A, a message format of a movement request (and a movement response to the movement request) 2101 includes a "message type", a "detailed type", a "parameter 1", and a "parameter 2". As depicted in FIG. 21B, the "message type" is set to either "path movement" or "path block cancellation". If the "message type" is "path movement", the NE 101 of the movement request transmission source sets the "detailed type" to "request". The NE 101 terminating an optical wavelength path set as the movement source optical wavelength sets the "detailed type" to "response" to send a response to the NE 101 that is the transmission source of the request. The NE 101 in the middle of the route of the optical wavelength path set as the movement source optical wavelength sets the "detailed type" to "response" if no movement destination optical wavelength is available, and sends a response to the NE 101 that is the transmission source of the request.

The "parameter 2" of the "response" is set as a determination result of the optical wavelength movement in the NE 101 relaying or terminating the optical wavelength path of the movement source optical wavelength, and is set to "OK" if a movement destination wavelength is available and to "NG" if no movement destination wavelength is available. The movement source optical wavelength ($\lambda$) of the "parameter 1" is set to a long-setup optical wavelength that is to be moved by the movement request transmission source NE 101. The movement destination optical wavelength ($\lambda$) of the "parameter 2" is set to a long-term-setting-path that is a movement destination at the movement request transmission source NE 101.

At the time of the "path block cancellation", the "detailed type" is set to "notification" and the "parameter 1" is set to the optical wavelength ($\lambda$) to be released.

Figure 22:
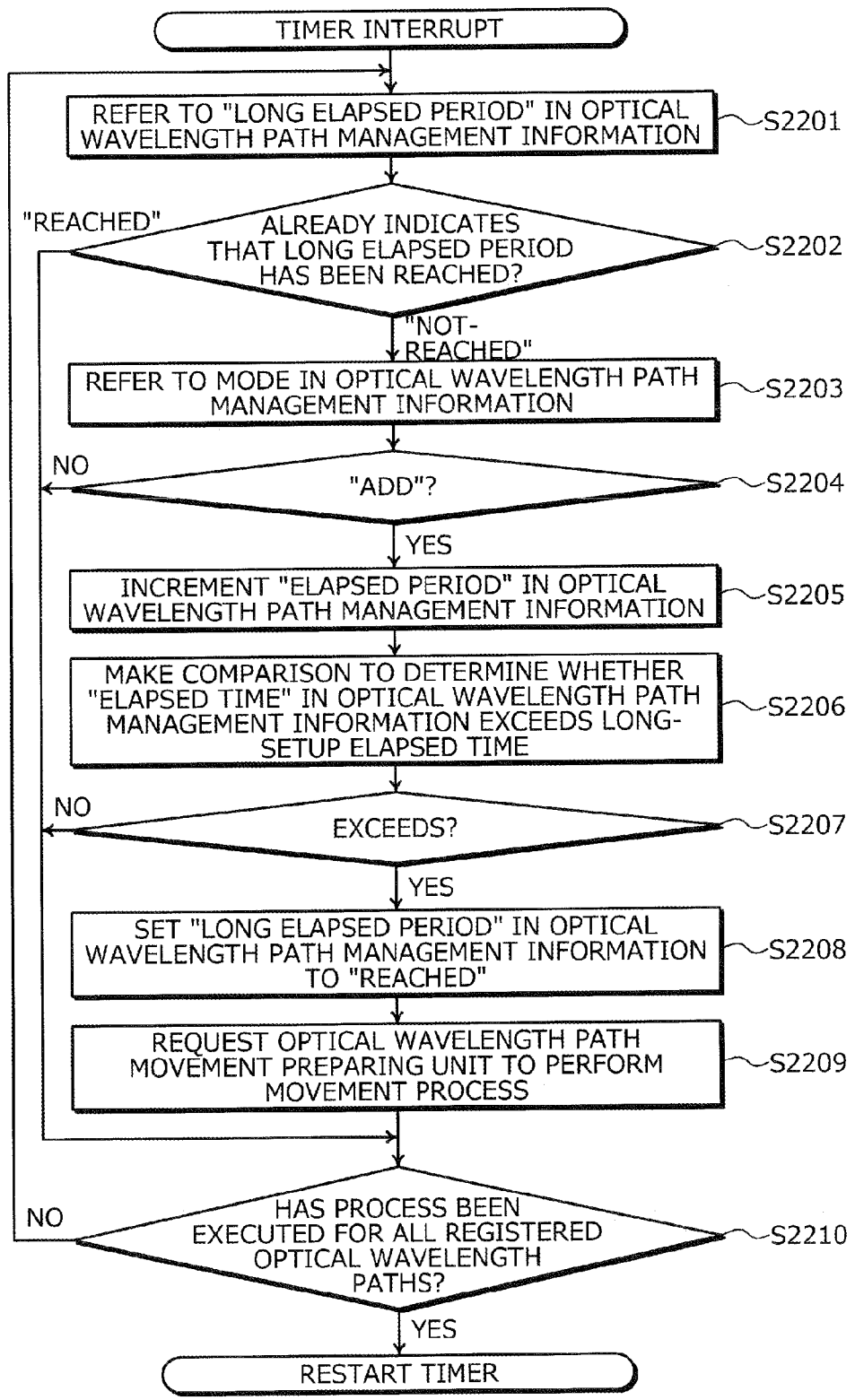
FIG. 22 is a flowchart of a process of determining a long-elapsed-period optical wavelength path according to the second embodiment.

A process for optical wavelength path optimization according to the second embodiment will be described. FIG. 22 is a flowchart of a process of determining a long-elapsed-period optical wavelength path according to the second embodiment. A process executed by the elapsed time monitoring unit 202 of the NE 101 by using a timer interrupt will be described. The elapsed time monitoring unit 202 refers to the "long elapsed period" in the optical wavelength path management information 210 (see FIG. 3) for each periodic timer interrupt of a constant period (step S2201). The elapsed time monitoring unit 202 determines whether the "long elapsed period" already indicates that the long elapsed period has been reached (step S2202). If the "long elapsed period" has not been reached (step S2202: not-reached), the elapsed time monitoring unit 202 proceeds to step S2203, and if the "long elapsed period" has been reached (step S2202: reached), the elapsed time monitoring unit 202 proceeds to step S2210.

At step S2203, the elapsed time monitoring unit 202 refers to the mode in the optical wavelength path management information 210 (step S2203), and determines whether the mode is insertion (Add) (step S2204). If the mode is insertion (Add) (step S2204: YES), this is a mode for time monitoring and therefore, the elapsed time monitoring unit 202 proceeds to step S2205. If the mode is other than insertion (Add) (step S2204: NO), the elapsed time monitoring unit 202 proceeds to step S2210.

At step S2205, the elapsed time monitoring unit 202 increments the "elapsed period" in the optical wavelength path management information 210 (step S2205) and makes a comparison to determine whether the "elapsed time" in the optical wavelength path management information 210 is greater than the long-setup elapsed time (step S2206). If the "elapsed period" of the optical wavelength path management information 210 is greater (e.g., equal to or greater) than the long-setup elapsed time (step S2207: YES), the elapsed time monitoring unit 202 proceeds to step S2208. If the "elapsed period" is shorter (e.g., less) than the long-setup elapsed time (step S2207: NO), the elapsed time monitoring unit 202 proceeds to step S2210.

At step S2208, the elapsed time monitoring unit 202 sets the "long elapsed period" in the optical wavelength path management information 210 to "reached" (step S2208). The elapsed time monitoring unit 202 requests the optical wavelength path movement preparing unit 1902 to perform a movement process for the optical wavelength path (step S2209). Subsequently, at step S2210, the elapsed time monitoring unit 202 determines whether the process has been executed for all the registered optical wavelength paths and if so (step S2210: YES), the elapsed time monitoring unit 202 terminates the process and restarts the timer. On the other hand, if an unprocessed path exists (step S2210: NO), the elapsed time monitoring unit 202 returns to step S2201.

Figure 23:
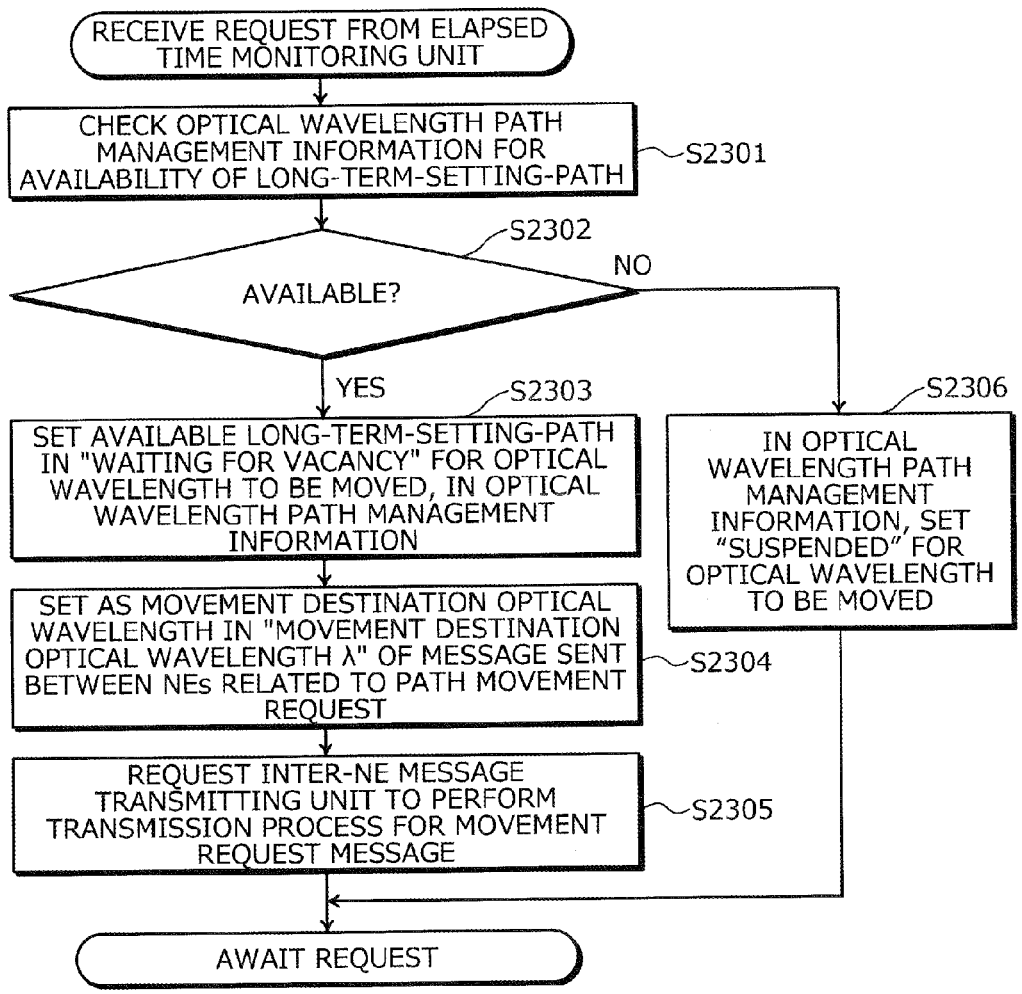
FIG. 23 is a flowchart of a process of determining whether an optical wavelength path can be moved according to the second embodiment.

FIG. 23 is a flowchart of a process of determining whether an optical wavelength path can be moved according to the second embodiment. A process executed by the optical wavelength path movement preparing unit 1902 will be described. The optical wavelength path movement preparing unit 1902 of the NE 101 executes a process of determining whether a long-elapsed-period optical wavelength path is movable and for transmitting a request for movement to an adjacent NE 101 on the route of the optical wavelength path if movable, or suspending the movement if not movable.

The optical wavelength path movement preparing unit 1902 receives from the elapsed time monitoring unit 202, a movement request for a long-elapsed-period optical wavelength path and executes the following process. First, the optical wavelength path movement preparing unit 1902 checks the optical wavelength path management information 210 for availability of a long-term-setting-path 100A (step S2301). If available (step S2302: YES), the optical wavelength path movement preparing unit 1902 proceeds to step S2303, and if not available (step S2302: NO), the optical wavelength path movement preparing unit 1902 proceeds to step S2306.

At step S2303, the optical wavelength path movement preparing unit 1902 sets the available long-term-setting-path 100A in the "waiting for vacancy" for the optical wavelength to be moved, in the optical wavelength path management information 210 (step S2303). The available long-term-setting-path 100A is set as the movement destination optical wavelength in "the movement destination optical wavelength (λ)" of the message sent between NEs 101 related to the path movement request (step S2304). The optical wavelength path movement preparing unit 1902 requests the inter-NE message transmitting unit 1903 to perform a transmission process for the movement request message (step S2305) and waits for the next request.

At step S2306, since the optical wavelength path cannot be moved, the optical wavelength path movement preparing unit 1902 sets "suspended" in the "waiting for vacancy" for the optical wavelength to be moved, in the optical wavelength path management information 210 (step S2306) and waits for the next request.

Figure 24:
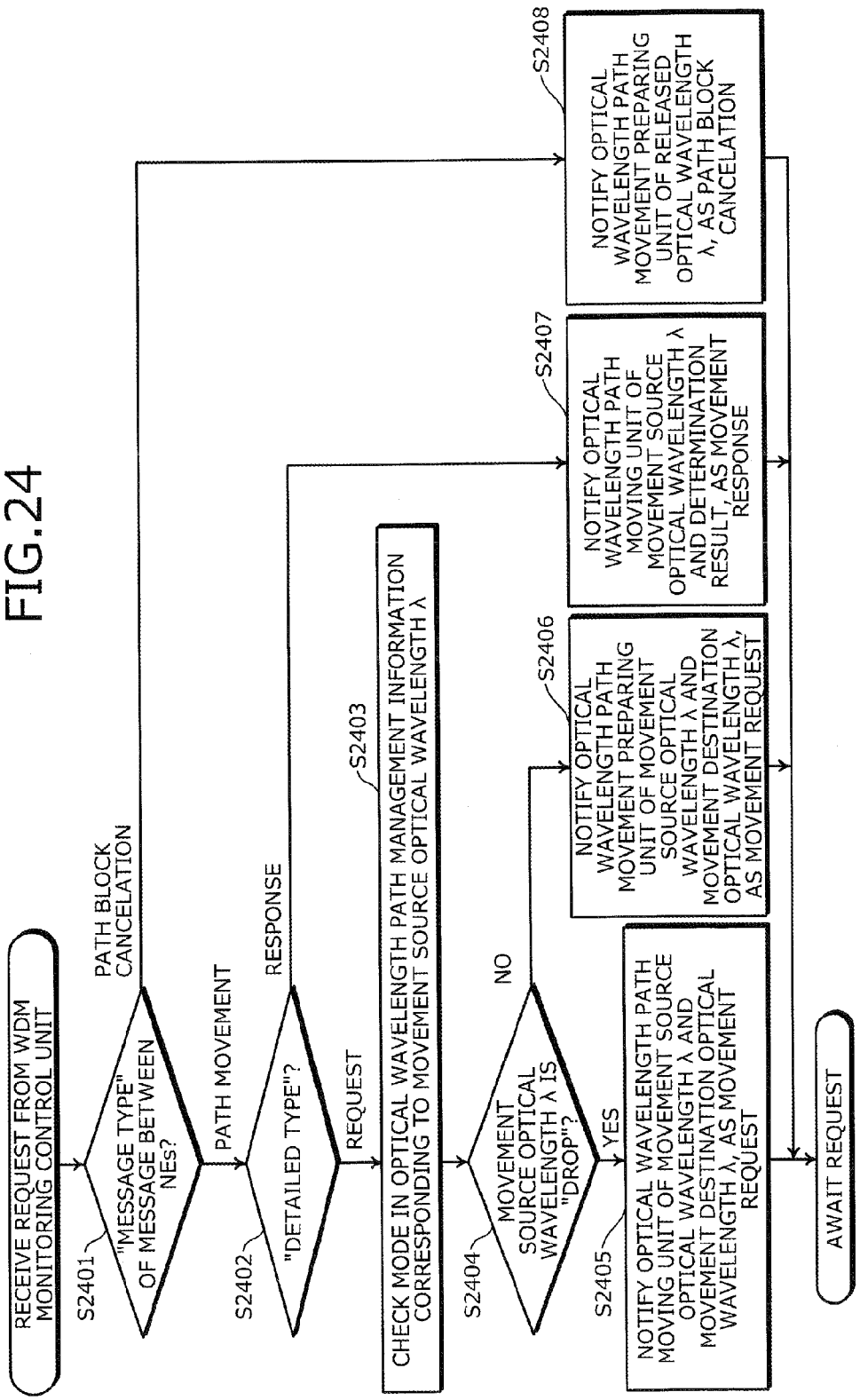
FIG. 24 is a flowchart of a process of requesting optical wavelength path movement, by message reception from an adjacent NE according to the second embodiment.

FIG. 24 is a flowchart of a process of requesting optical wavelength path movement, by message reception from an adjacent NE according to the second embodiment. The process depicted in FIG. 24 is described as a process executed by the inter-NE message receiving unit 1904 of the NE 101.

First, when the WDM monitoring control unit 1905 receives a request from an adjacent NE 101 through an OSC, the inter-NE message receiving unit 1904 determines the "message type" of the message between the NEs 101 (step S2401). If the received "message type" is "path movement" (step S2401: path movement), the inter-NE message receiving unit 1904 proceeds to step S2402, and if the received "message type" is "path block cancellation" (step S2401: path block cancellation), the inter-NE message receiving unit 1904 proceeds to step S2408.

At step S2402, the "detailed type" is determined and, in the case of "request" (step S2402: request), the inter-NE message receiving unit 1904 checks the mode in the optical wavelength path management information 210 corresponding to the movement source optical wavelength (λ) (step S2403). If the "detailed type" is "response" (step S2402: response), the inter-NE message receiving unit 1904 proceeds to step S2407.

After step S2403, the inter-NE message receiving unit 1904 determines whether the movement source optical wavelength (λ) is branch (Drop) (step S2404). If the movement source optical wavelength (λ) is branch (Drop) (step S2404: YES), the inter-NE message receiving unit 1904 proceeds to step S2405I; if other than branch (Drop) (step S2404: NO), the inter-NE message receiving unit 1904 proceeds to step S2406.

At step S2405, the inter-NE message receiving unit 1904 notifies the optical wavelength path moving unit 203 of the movement source optical wavelength (λ) and the movement destination optical wavelength (λ), as a movement request (step S2405). At step S2406, the inter-NE message receiving unit 1904 notifies the optical wavelength path movement preparing unit 1902 of the movement source optical wavelength (λ) and the movement destination optical wavelength (λ), as a movement request (step S2406). At step S2407, the inter-NE message receiving unit 1904 notifies the optical wavelength path moving unit 203 of the movement source optical wavelength (λ) and a determination result, as a movement response (step S2407). At step S2408, the inter-NE message receiving unit 1904 notifies the optical wavelength path movement preparing unit 1902 of a released optical wavelength (λ), as a path block cancellation (step S2408). After the operations at step S2405 to step S2408, the inter-NE message receiving unit 1904 waits for the next process request.

Figure 25:
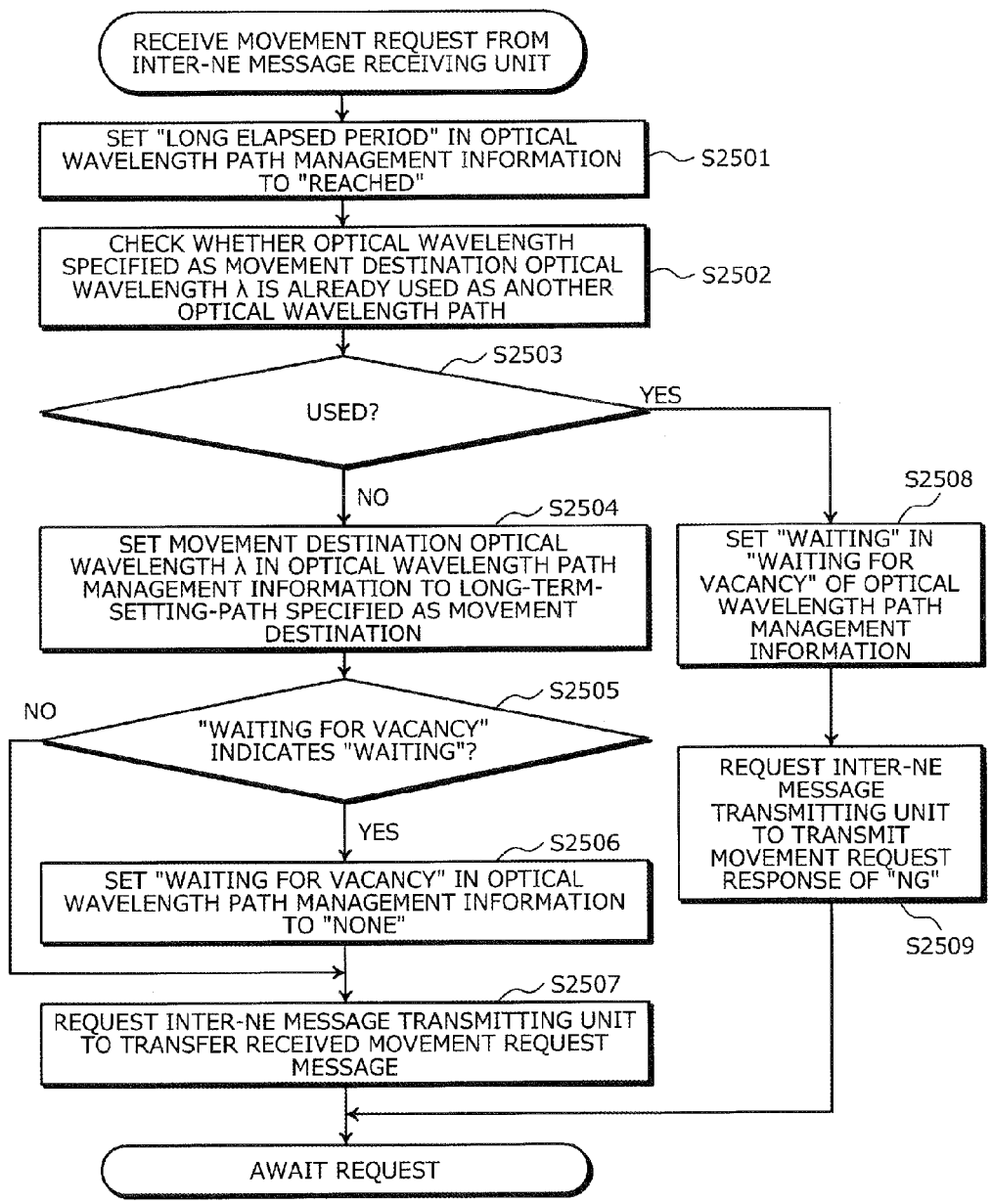
FIG. 25 is a flowchart of a process of determining whether movement is possible at a given NE and transferring a movement request to another NE based on a request for optical wavelength path movement according to the second embodiment.

FIG. 25 is a flowchart of a process of determining whether movement is possible at a given NE and transferring a movement request to another NE based on a request for optical wavelength path movement according to the second embodiment. The process depicted in FIG. 25 is executed by the optical wavelength path movement preparing unit 1902 and upon receiving a request for movement of the long-elapsed-period optical wavelength path from another NE 101, the optical wavelength path movement preparing unit 1902 determines whether the optical wavelength path movement preparing unit 1902 can perform the movement (be performed by the NE 101 thereof). If the request can be accepted, the request is further transferred to another adjacent NE 101 on the route, and if the request cannot be accepted, a response of NG is returned to the NE 101 that issued the movement request.

Upon receiving a movement request from another NE 101 via the inter-NE message receiving unit 1904, the optical wavelength path movement preparing unit 1902 first sets the "long elapsed period" in the optical wavelength path management information 210 to "reached" (step S2501). The optical wavelength path movement preparing unit 1902 refers to the optical wavelength path management information 210 to check whether an optical wavelength specified as the movement destination optical wavelength (λ) is already used as another optical wavelength path (step S2502). If the specified optical wavelength is not already used (step S2503: NO), the optical wavelength path movement preparing unit 1902 proceeds to step S2504, and if used (step S2503: YES), the optical wavelength path movement preparing unit 1902 proceeds to step S2508.

At step S2504, the optical wavelength path movement preparing unit 1902 sets the movement destination optical wavelength (λ) in the optical wavelength path management information 210 to the long-term-setting-path 100A specified as the movement destination (step S2504). The optical wavelength path movement preparing unit 1902 then determines whether the "waiting for vacancy" indicates "waiting" (step S2505). If the "waiting for vacancy" indicates "waiting" (step S2505: YES), the "waiting for vacancy" in the optical wavelength path management information 210 is set to "none" (step S2506) and the process proceeds to step S2507. If the "waiting for vacancy" does not indicate "waiting" (step S2505: NO), the optical wavelength path movement preparing unit 1902 proceeds to step S2507.

At step S2507, the optical wavelength path movement preparing unit 1902 requests the inter-NE message transmitting unit 1903 to transfer the received movement request message to another NE 101 (step S2507) and waits for the next request.

At step S2508, the optical wavelength path movement preparing unit 1902 sets "waiting" in the "waiting for vacancy"

in the optical wavelength path management information 210 (step S2508), then requests the inter-NE message transmitting unit 1903 to transmit a movement request response set to "NG" to another NE 101 (step S2509), and waits for the next request.

Figure 26:
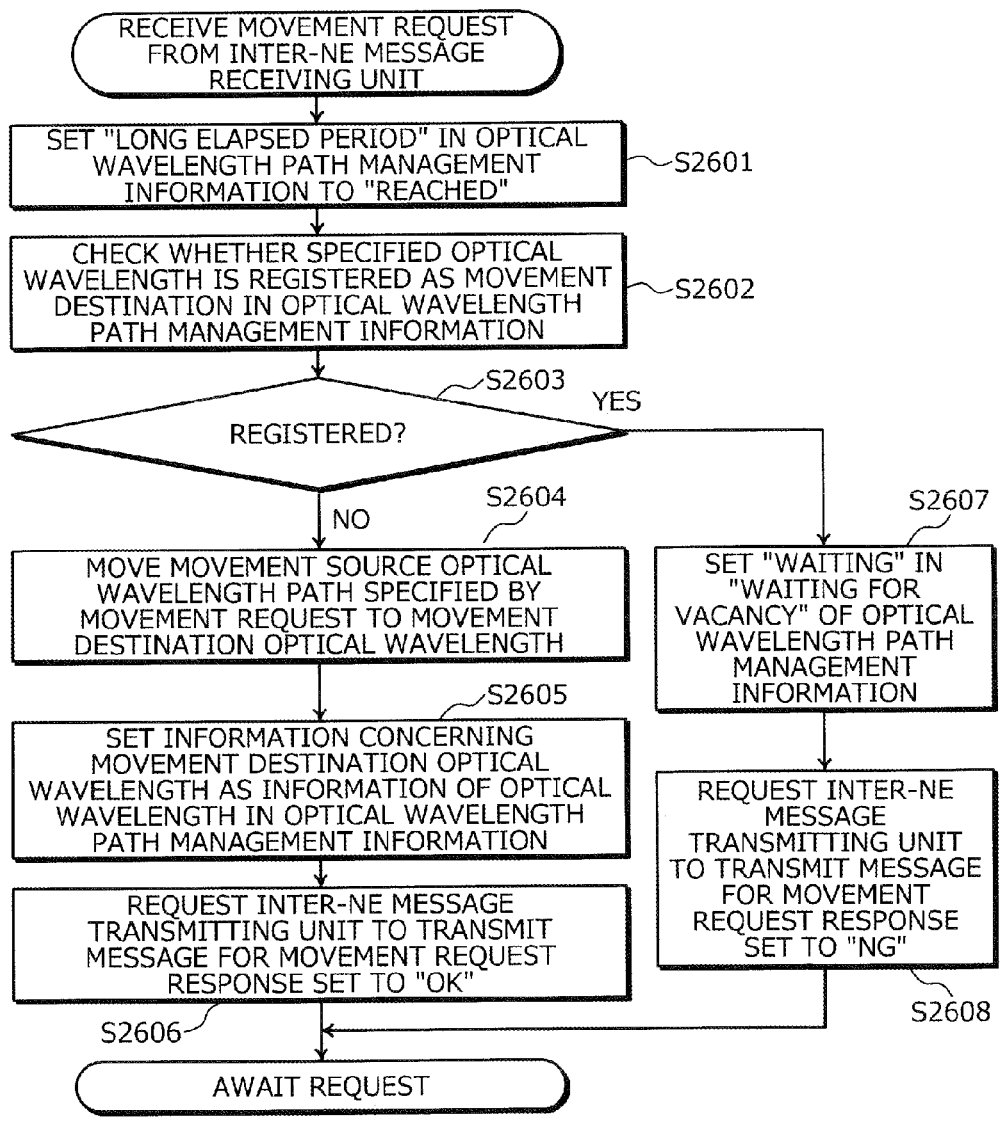
FIG. 26 is a flowchart of a movement process based on a request for optical wavelength path movement according to the second embodiment.

FIG. 26 is a flowchart of a movement process based on a request for optical wavelength path movement according to the second embodiment. In FIG. 26, the optical wavelength path movement preparing unit 1902 determines whether a long-elapsed-period optical wavelength path is movable. The optical wavelength path movement preparing unit 1902 transmits a movement request to an adjacent NE 101 on the route of the optical wavelength path if movable, or suspends the movement if not movable.

When receiving a movement request from the inter-NE message receiving unit 1904, the optical wavelength path movement preparing unit 1902 first sets the "long elapsed period" in the optical wavelength path management information 210 to "reached" (step S2601). The optical wavelength path movement preparing unit 1902 then checks whether the specified optical wavelength is registered as the movement destination in the optical wavelength path management information 210 (step S2602). If not registered (step S2603: NO), the optical wavelength path movement preparing unit 1902 proceeds to step S2604, and if registered (step S2603: YES), the optical wavelength path movement preparing unit 1902 proceeds to step S2607.

At step S2604, optical wavelength path movement preparing unit 1902 moves the optical wavelength path of the movement source specified by the movement request to the optical wavelength of the movement destination (step S2604). The optical wavelength path movement preparing unit 1902 sets information concerning the optical wavelength of the movement destination as the information of the optical wavelength in the optical wavelength path management information 210 (step S2605). The optical wavelength path movement preparing unit 1902 then requests the inter-NE message transmitting unit 1903 to transmit a message for a movement request response set to "OK" (step S2606) and waits for the next request.

At step S2607, the optical wavelength path movement preparing unit 1902 sets "waiting" in the "waiting for vacancy" of the optical wavelength path management information 210 (step S2607), then requests the inter-NE message transmitting unit 1903 to transmit a message for a movement request response set to "NG" (step S2608), and waits for the next request.

Figure 27:
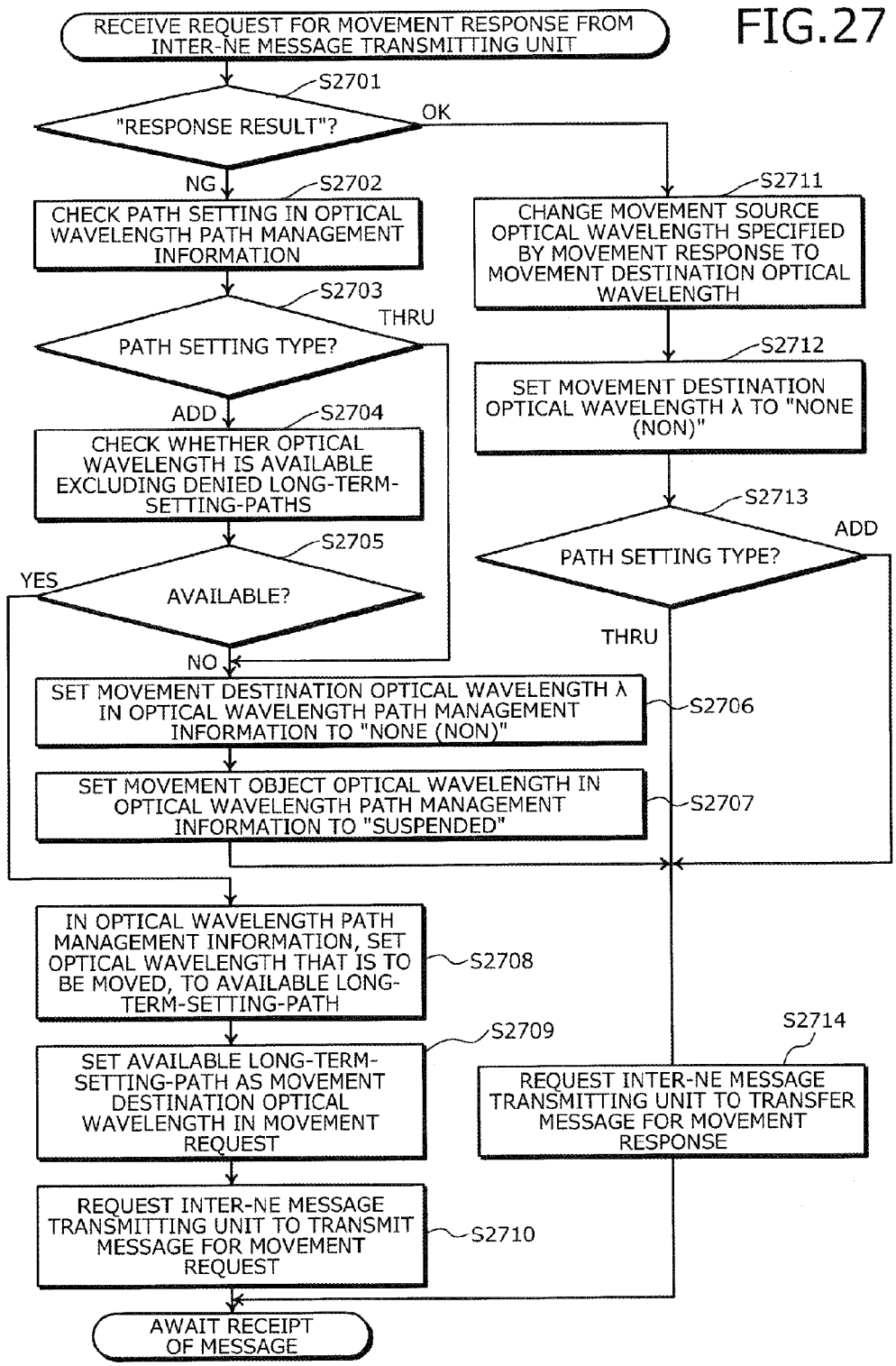
FIG. 27 is a flowchart of a process of determining optical wavelength movement based on reception of a movement response for an optical wavelength path.

FIG. 27 is a flowchart of a process of determining optical wavelength movement based on reception of a movement response for an optical wavelength path. The process depicted in FIG. 27 is executed by the optical wavelength path moving unit 203. The optical wavelength path moving unit 203 receives a movement response request for a long-elapsed-period optical wavelength path, determines whether the movement is possible, and moves the optical wavelength if possible. If it is determined that the movement is impossible, the optical wavelength path moving unit 203 returns "NG" as a response to the movement request transmission source NE 101.

When receiving a request for a movement response from the inter-NE message receiving unit 1904, the optical wavelength path moving unit 203 first determines a "response result" (step S2701). If the "response result" is "NG" (step S2701: NG), the optical wavelength path moving unit 203 proceeds to step S2702; if "OK" (step S2701: OK), the optical wavelength path moving unit 203 proceeds to step S2711.

At step S2702, the optical wavelength path moving unit 203 refers to the optical wavelength path route information to check the path setting in the optical wavelength path management information 210 (step S2702). If the type of the path setting is "insertion (Add)" (step S2703: Add), the optical wavelength path moving unit 203 proceeds to step S2704; if the type is "passage (Thru)" (step S2703: Thru), the optical wavelength path moving unit 203 proceeds to step S2706.

At step S2704, the optical wavelength path moving unit 203 checks whether an optical wavelength is available excluding denied long-term-setting-paths 100A (step S2704). If an optical wavelength is available (step S2705: YES), the optical wavelength path moving unit 203 proceeds to step S2708. If not available (step S2705: NO), the optical wavelength path moving unit 203 proceeds to step S2706.

At step S2706, the optical wavelength path moving unit 203 sets the movement destination optical wavelength (λ) in the optical wavelength path management information 210 to "none (Non)" (step S2706), sets the movement object optical wavelength in the optical wavelength path management information 210 to "suspended" (step S2707), and proceeds to step S2714.

At step S2708, in the optical wavelength path management information 210, the optical wavelength path moving unit 203 sets to the available long-term-setting-path 100A, the optical wavelength that is to be moved (step S2708). The optical wavelength path moving unit 203 then sets the available long-term-setting-path 100A as the movement destination optical wavelength in the movement request (step S2709). The optical wavelength path moving unit 203 requests the inter-NE message transmitting unit 1903 to transmit a message for a movement request (step S2710) and waits for the next message.

At step S2711, the optical wavelength path moving unit 203 changes the movement source optical wavelength specified by the movement response to the optical wavelength of the movement destination (step S2711). The optical wavelength path moving unit 203 copies the information of the optical wavelength in the optical wavelength path management information 210, according to the information of the movement destination optical wavelength (λ). The optical wavelength path moving unit 203 sets the movement destination optical wavelength (λ) to "none (Non)" (step S2712). The optical wavelength path moving unit 203 determines the type of the path setting (step S2713); and if the type is "passage (Thru)" (step S2713: Thru) or if the type is "insertion (Add)" (step S2713: Add), the optical wavelength path moving unit 203 requests the inter-NE message transmitting unit 1903 to transfer the message for the movement response (step S2714) and waits for the next message reception.

Figure 28:
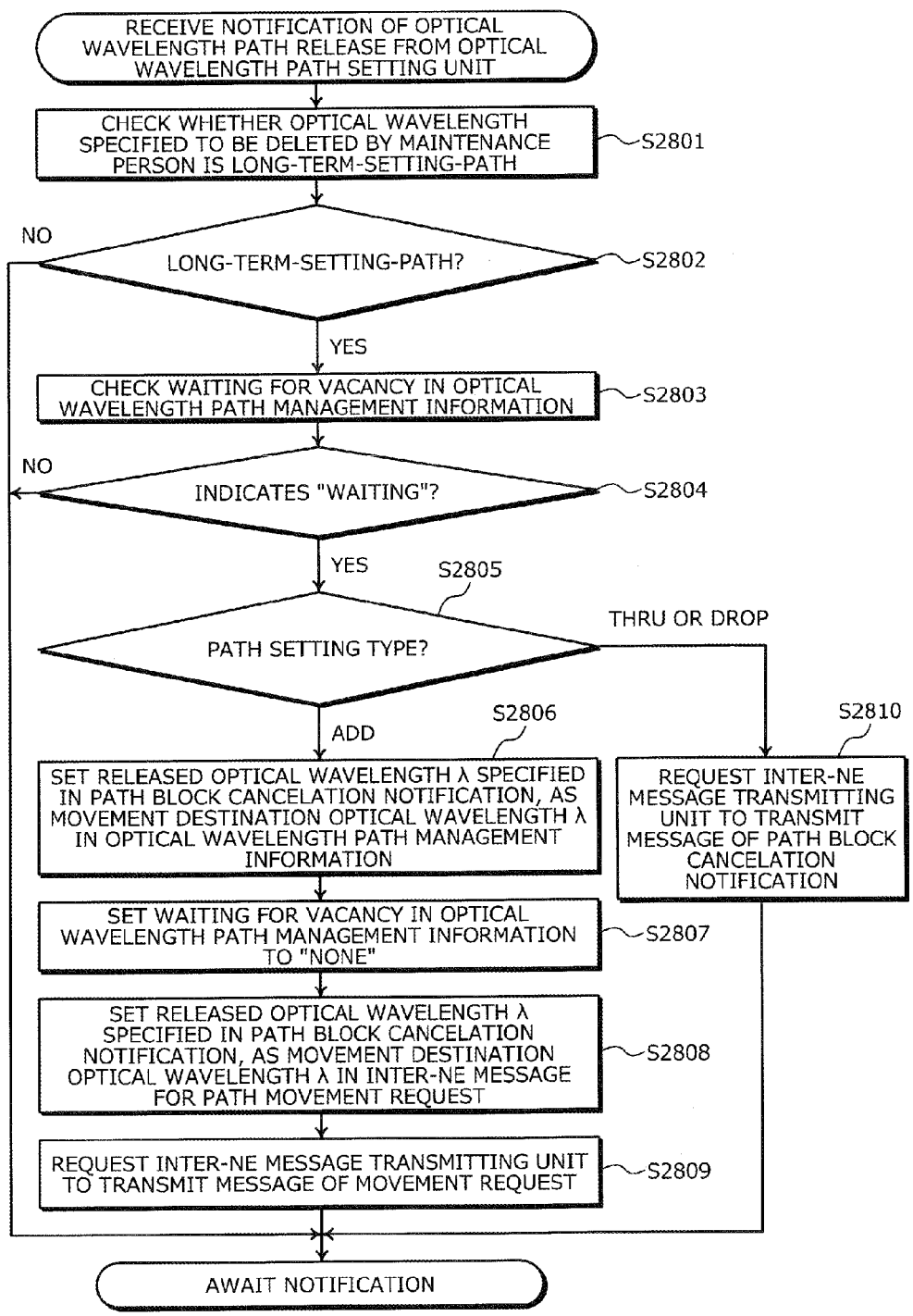
FIG. 28 is a flowchart of a process associated with deletion of an optical wavelength set as a long-term-setting-path according to the second embodiment.

FIG. 28 is a flowchart of a process associated with deletion of an optical wavelength set as a long-term-setting-path according to the second embodiment. FIG. 28 depicts a process executed by the suspended path moving unit 204. When the optical wavelength path set to an optical wavelength of the long-term-setting-path 100A is deleted, the suspended path moving unit 204 makes a notification of the deletion of the optical wavelength path so as to move the long-elapsed-period optical wavelength path waiting for movement in another NE 101. If the optical wavelength path of the long-term-setting-path 100A is deleted at an NE 101 for insertion (Add), the movement request for the long-elapsed-period optical wavelength path is immediately made through a message between the NEs 101.

When receiving the notification of the optical wavelength path release from the optical wavelength path setting unit 201, the suspended path moving unit 204 first checks whether the optical wavelength specified to be deleted by a maintenance person is the long-term-setting-path 100A (step S2801). If the long-term-setting-path 100A is to be deleted (step S2802: YES), the suspended path moving unit 204 proceeds to step S2803; if the long-term-setting-path 100A is not to be deleted (step S2802: NO), the suspended path moving unit 204 terminates the process and waits for the next notification.

At step S2803, the suspended path moving unit 204 checks the waiting for vacancy in the optical wavelength path management information 210 (step S2803). If the waiting for vacancy indicates "waiting (suspended)" (step S2804: YES), the process proceeds to step S2805. If the waiting for vacancy indicates "none" (step S2804: NO), the suspended path moving unit 204 terminates the process and waits for the next notification.

At step S2805, the suspended path moving unit 204 refers to the optical wavelength path route information to check the type of the path setting (step S2805). If the path setting is "insertion (Add)" (step S2805: Add), the suspended path moving unit 204 proceeds to step S2806. If the path setting is "passage (Thru) or branch (Drop)" (step S2805: Thru or Drop), the suspended path moving unit 204 proceeds to step S2810.

At step S2806, the suspended path moving unit 204 sets the released optical wavelength (λ) specified in a path block cancellation notification, as the movement destination optical wavelength (λ) in the optical wavelength path management information 210 (step S2806). Subsequently, the suspended path moving unit 204 sets the waiting for vacancy in the optical wavelength path management information 210 to "none" (step S2807) and sets the released optical wavelength (λ) specified in the path block cancellation notification, as the movement destination optical wavelength (λ) in an inter-NE message for the path movement request (step S2808). The suspended path moving unit 204 requests the inter-NE message transmitting unit 1903 to transmit the message of the movement request (step S2809), terminates the process, and waits for the next notification.

At step S2810, the suspended path moving unit 204 requests the inter-NE message transmitting unit 1903 to transmit a message of a path block cancellation notification (step S2810), terminates the process, and waits for the next notification.

Figure 29:
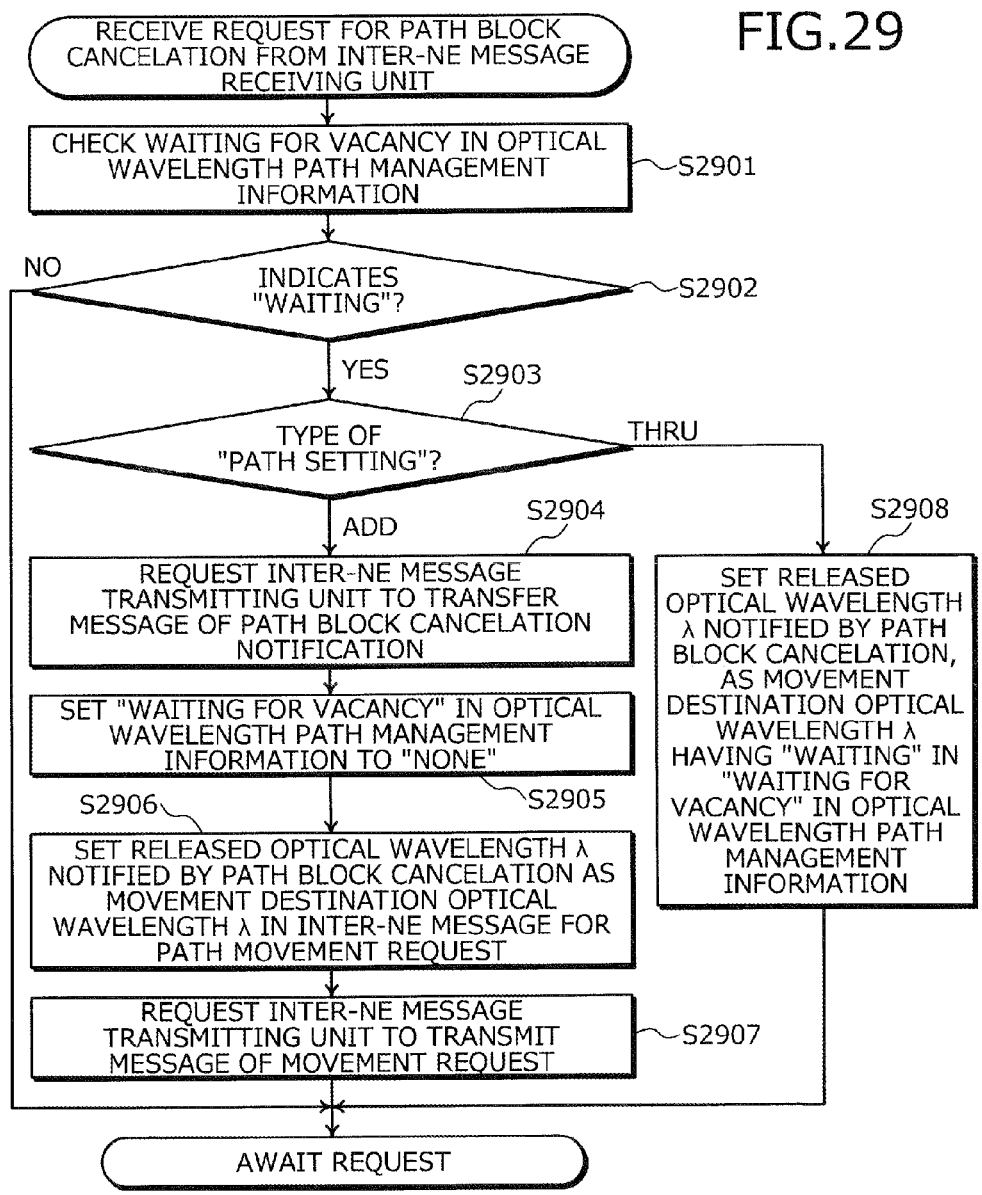
FIG. 29 is a flowchart of a process of resuming movement of an optical wavelength path based on notification of path block cancellation according to the second embodiment.

FIG. 29 is a flowchart of a process of resuming movement of an optical wavelength path based on notification of path block cancellation according to the second embodiment. The process of FIG. 29 is executed by the optical wavelength path movement preparing unit 1902. When receiving the inter-NE message of the path block cancellation supplied from another NE 101, the optical wavelength path movement preparing unit 1902 resumes the movement of the long-elapsed-period optical wavelength path. If the NE 101 of the optical wavelength path movement preparing unit 1902 is a passage (Thru) NE, a process is executed only for transferring the inter-NE message of the path block cancellation.

When receiving a request for the path block cancellation from the inter-NE message receiving unit 1904, the optical wavelength path movement preparing unit 1902 first checks the "waiting for vacancy" in the optical wavelength path management information 210 (step S2901). If the waiting for vacancy indicates "waiting (suspended)" (step S2902: YES), the optical wavelength path movement preparing unit 1902 proceeds to step S2903. If the waiting for vacancy indicates "none", the optical wavelength path movement preparing unit 1902 terminates the process and waits for the next request.

At step S2903, the optical wavelength path movement preparing unit 1902 checks the type of the path setting from the optical wavelength path route information (step S2903). If the type of the path setting is "insertion (Add)" (step S2903: Add), the optical wavelength path movement preparing unit 1902 proceeds to step S2904. If the type of the path setting is "passage (Thru)" (step S2903: Thru), the optical wavelength path movement preparing unit 1902 proceeds to step S2908.

At step S2904, the optical wavelength path movement preparing unit 1902 requests the inter-NE message transmitting unit 1903 to transfer the message of the path block cancellation notification (step S2904). Subsequently, the optical wavelength path movement preparing unit 1902 sets the "waiting for vacancy" in the optical wavelength path management information 210 to "none" (step S2905). The optical wavelength path movement preparing unit 1902 sets the released optical wavelength (λ) notified by the path block cancellation as the movement destination optical wavelength (λ) in an inter-NE message for the path movement request (step S2906) and the optical wavelength path movement preparing unit 1902 requests the inter-NE message transmitting unit 1903 to transmit the message for the movement request (step S2907), terminates the process, and waits for the next request.

At step S2908, the optical wavelength path movement preparing unit 1902 sets the released optical wavelength (λ) notified by the path block cancellation, as the movement destination optical wavelength (λ) having "waiting (suspend)" in the "waiting for vacancy" in the optical wavelength path management information 210 (step S2908), terminates the process, and waits for the next request.

Figure 30:
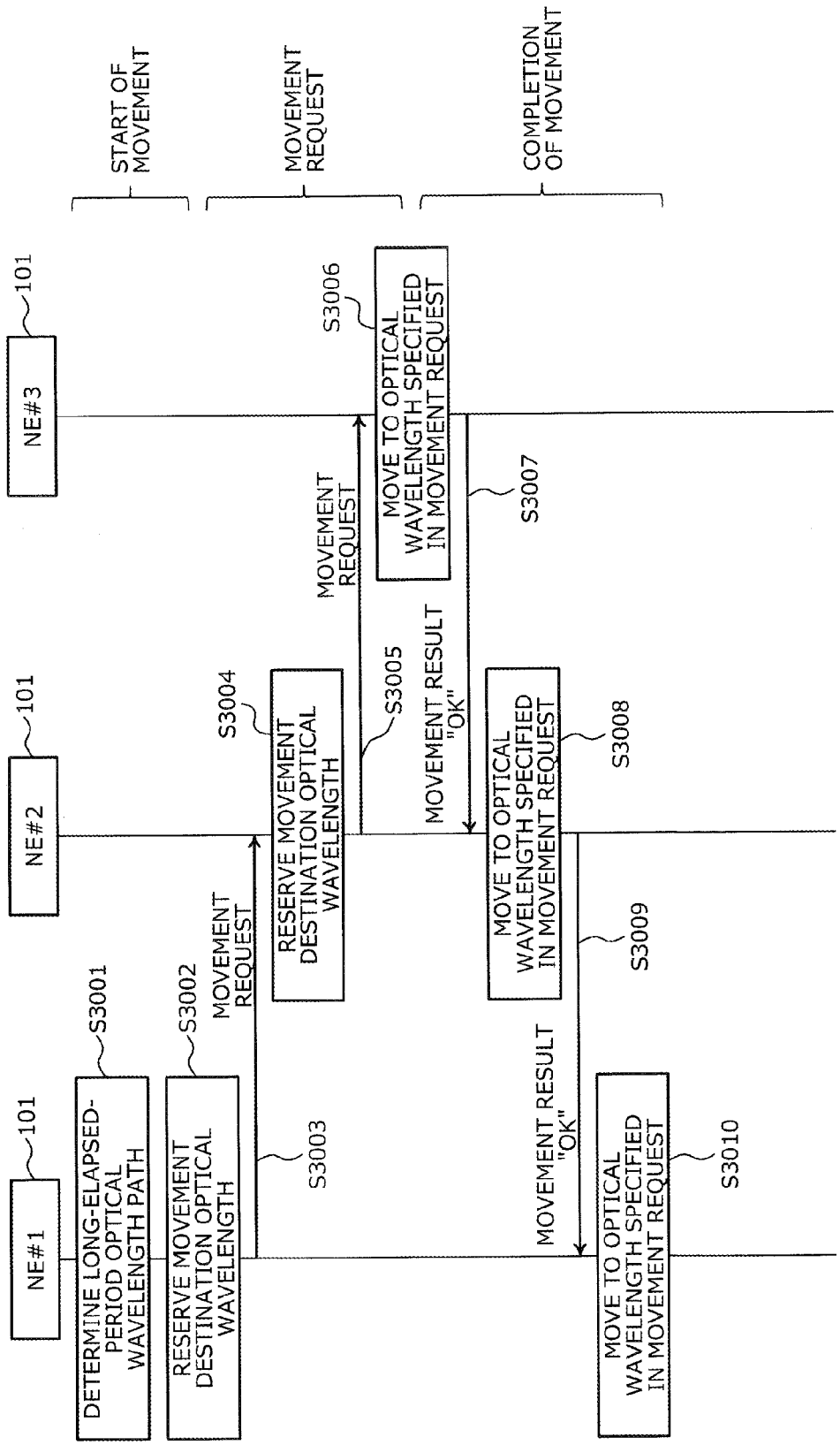
FIG. 30 is a sequence diagram of optical wavelength path movement through message transmission/reception between the NEs according to the second embodiment.

FIG. 30 is a sequence diagram of optical wavelength path movement through message transmission/reception between the NEs according to the second embodiment. If a long-period optical wavelength path is determined in the insertion (Add) NE 101 of the optical wavelength path to be moved, a movement request is transmitted to the NEs 101 on the route of the optical wavelength path. The NEs 101 on the route accept the movement request if an optical wavelength specified as the movement destination is available, and sequentially move the optical wavelength path.

As depicted in FIG. 30, if a given optical wavelength path is determined as the long-period optical wavelength path at the NE 1 (101) (step S3001), the optical wavelength of the movement destination is reserved (step S3002) and the movement request 2101 depicted in FIG. 21 is transmitted to the adjacent NE #2 (101) on the route of the optical wavelength path (step S3003).

The NE #2 (101) receiving the movement request 2101 reserves the optical wavelength of the movement destination (step S3004) and transmits the movement request 2101 to the adjacent NE #3 (101) on the route of the optical wavelength path (step S3005).

The NE #3 (101) receiving the movement request 2101 moves the optical wavelength according to the movement request (step S3006) and transmits a movement result "OK/NG" to the adjacent NE #2 (101) (step S3007). The NE #2 (101) also moves the optical wavelength according to the movement request (step S3008) and transmits a movement result "OK/NG" to the adjacent NE #1 (101) (step S3009). In the example of FIG. 30, both NEs can move the optical wavelength and return "OK". The NE #1 (101) also moves the optical wavelength according to the movement request (step S3010). As described above, the movement request message is exchanged between the NEs 101, and the NEs 101 move the optical wavelength path in a synchronized manner.

FIG. 31 is a diagram of a state in which a predetermined optical wavelength path is moved according to the second embodiment. As depicted in FIG. 31, when the optical wavelength path of the optical wavelength λ4 (terminated by the NEs #1 and #3; the NE #2 is Thru) becomes a long-elapsed-period optical wavelength path and the optical wavelength λ3 among the long-term-setting-paths 100A is available, the optical wavelength path is moved by changing the optical wavelength from λ4 to λ3.

FIGS. 32A, 32B, and 32C are charts of settings in the optical wavelength path management information at the time of movement of the optical wavelength path according to the second embodiment. FIGS. 32A, 32B, and 32C depict settings in the optical wavelength path management information at the time of movement of the optical wavelength path depicted in FIG. 31. FIG. 32A depicts the optical wavelength path management information 210 at the time of start of movement of the optical wavelength path for optimization; FIG. 32B depicts the optical wavelength path management information 210 at the time of a request for the movement of the optical wavelength path for optimization; and FIG. 32C depicts the optical wavelength path management information 210 at the time of completion of the movement.

As depicted in FIG. 32A, at the start of movement for optimization, since the elapsed time of the optical wavelength path of the optical wavelength λ4 set to the path setting mode of insertion (Add) has reached a threshold value ("10 hours" in the example of FIG. 32A) for the long elapsed time at the elapsed time monitoring unit 202, the NE #1 (101) determines that the optical wavelength path is the long-setup optical wavelength path and sets a long elapsed period 3201 in the optical wavelength path management information to "reached".

The optical wavelength path movement preparing unit 1902 searches for an available long-term-setting-path (λ1 to λ3), determines that the optical wavelength λ3 is available and therefore, sets and reserves the movement destination optical wavelength λ3 (3202 in FIG. 32A) as a reserved path for the optical wavelength λ4 in the optical wavelength path management information.

As depicted in FIG. 32B, at the time of a request for the movement for optimization, the optical wavelength path movement preparing unit 1902 of the NE #1 (101) transmits the movement request 2101 from the inter-NE message transmitting unit 1903 by utilizing the OSC, to the adjacent NE #2 (directional path #1) 101 toward the branch (Drop) NE #3 (101) of the optical wavelength path to be moved.

The inter-NE message receiving unit 1904 of the NE #2 (101) receives the movement request 2101 from the NE #1 (101) through the directional path #1. The optical wavelength path movement preparing unit 1902 checks whether the optical wavelength λ3 set as the movement destination optical wavelength λ of the movement request 2101 is available in the directional path #1. If it is determined that the corresponding optical wavelength λ3 (3211 in FIG. 32B) is available, the optical wavelength λ3 of the movement destination is set and reserved as the movement destination λ of the optical wavelength λ4 of the directional path #1 in the optical wavelength path management information 210.

Since the optical wavelength λ4 is in a mode for passage (Thru) at the NE #2 (101), it is also checked whether the optical wavelength λ3 specified as the movement destination λ by the movement request is available in the directional path #2 of the NE #2 (101). Since it can be determined that the optical wavelength λ3 is available, the movement request 2101 is transferred to the adjacent NE #3 (directional path #2) 101 toward the branch (Drop) NE (NE #3) 101.

At the NE #3 (101), the inter-NE message receiving unit 1904 receives the movement request 2101 from the NE #1 (101) through the directional path #1. The optical wavelength path moving unit 203 checks whether the optical wavelength λ4 of the movement source set in the movement request 2101 is available. Since it can be determined that the optical wavelength λ4 is available, the location of the optical wavelength set to λ4 in the optical wavelength path management information 210 is set to λ3, which has been specified as the movement destination λ of the movement request 2101. Since the optical wavelength path is branched (dropped) at the NE #3 (101), the NE #3 (101) changes λ4 of the movement source specified in the request to λ3 (3212 in FIG. 32B).

As depicted in FIG. 32C, at the time of completion of the movement for optimization, the NE #3 (101) sets "OK" to respond that the movement request 2101 from the directional path #1 is accepted. When receiving the response to the movement request 2101 from the directional path #2, the NE #2 (101) moves the optical wavelength λ4 to the reserved optical wavelength λ3 (3221 in FIG. 32C). The NE #1 (101) receives the response to the movement request 2101 from the directional path #1 and moves the optical wavelength path of the optical wavelength λ4 to the reserved optical wavelength λ3 (3222 in FIG. 32C).

FIG. 33 is a sequence diagram of movement after suspension of an optical wavelength path according to the second embodiment. FIG. 33 depicts a state of suspension of movement of an optical wavelength when the NEs #1 to #3 (101) on the route of the optical wavelength path have no available optical wavelength as the movement destination specified by the movement request 2101 and cannot accept the movement request 2101.

The NE #1 (101) determines a long-elapsed-period optical wavelength path (step S3301). However, if a movement destination for the long-elapsed-period optical wavelength path is not available, the movement of the optical wavelength is suspended, and the optical wavelength (the movement destination) is reserved (step S3302).

The NE #1 (101) subsequently sends the movement request 2101 to the adjacent NE #2 (101) (step S3303). If the optical wavelength (the movement destination) is not available at the NE #2 (101) (step S3304), "NG" is returned as the movement response 2101 to the NE #1 (101) (step S3305).

As a result, the NE #1 (101) cancels the reservation of the optical wavelength (the movement destination) (step S3306) and suspends the movement of the movement source optical wavelength (step S3307). If a long-term-setting-path 100A becomes available at the NE #2 (101) (step S3308), the NE #2 (101) sends a path block cancellation to the NE #1 (101) (step S3309).

The NE #1 (101) reserves, as the movement destination, the optical wavelength indicated in the block cancellation (step S3310). The NE #1 (101) sends the movement request 2101 to the NE #2 (101) (step S3311). The NE #2 (101) reserves the optical wavelength (the movement destination) (step S3312) and sends the movement request 2101 to the adjacent NE #3 (101) (step S3313).

The NE #3 (101) performs movement to the optical wavelength specified by the movement request (step S3314) and sends "OK" as the movement response 2101 to the NE #2 (101) (step S3315). The NE #2 (101) performs movement to the optical wavelength specified by the movement request (step S3316) and sends "OK" as the movement response 2101 to the NE #1 (101) (step S3317). The NE #1 (101) performs movement to the optical wavelength specified by the movement request 2101 (step S3318).

As described above, if the long-term-setting-path 100A is not available, the movement of the optical wavelength is suspended and, when the long-term-setting-path 100A becomes available, the suspension can be cancelled to move the optical wavelength. The suspension, the suspension cancellation and the movement can be performed through communication between the NEs #1 to #3 (101) in synchronization with one another.

FIG. 34 is a diagram of a state of movement after movement suspension of the optical wavelength path according to the second embodiment. As depicted in FIG. 34, it is assumed that all the wavelengths λ1 to λ3 among the long-term-setting-paths 100A are being used and are unavailable. In this case, even when the optical wavelength path (terminated by the NEs #1 and #3; the NE #2 is Thru) of the optical wavelength λ4 becomes a long-elapsed-period optical wavelength path, movement to a long-term-setting-path 100A cannot be performed and the movement is suspended.

It is assumed that a vacancy subsequently occurs because the optical wavelength path (terminated by the NEs #2 and #3) 100d of the optical wavelength λ3 among the long-term-setting-paths 100A has been deleted. As a result, the suspended optical wavelength path of the optical wavelength λ4 can be moved to the optical wavelength λ3.

FIGS. 35AA, 35AB, 35AC, 35BD, 35BE, and 35BF are charts of setting details in the optical wavelength path management information including suspension of the optical wavelength path according to the second embodiment. FIGS. 35AA to 35AC depict the setting details of the optical wavelength path management information from the suspension to the movement completion of the optical wavelength path depicted in FIG. 34. FIG. 35AA depicts the optical wavelength path management information 210 at the start of suspension of the movement of the optical wavelength path for optimization; FIG. 35AB depicts the optical wavelength path management information 210 at the time of suspension completion of the movement of the optical wavelength path for optimization; and FIG. 35AC depicts the optical wavelength path management information 210 at the start of suspension cancellation of the movement of the optical wavelength path for optimization. FIG. 35BD depicts the optical wavelength path management information 210 at the time of request for suspension cancellation of the movement of the optical wavelength path for optimization; FIG. 35BE depicts the optical wavelength path management information 210 at the time of completion of suspension cancellation of the movement of the optical wavelength path for optimization; and FIG. 35BF depicts the optical wavelength path management information 210 at the time of completion of the movement.

As depicted in FIG. 35AA, at the start of suspension of the movement for optimization, the elapsed time monitoring unit 202 of the NE #1 (101) determines that the optical wavelength path of the optical wavelength λ4 is the long-setting optical wavelength path because of the elapse of 10 hours and sets a long elapsed period 3501 to "reached". An available long-term-setting-path (λ1 to λ3) of the NE #1 (101) is searched for and since it is determined that the optical wavelength λ3 is available, the optical wavelength λ3 is set and reserved as the movement destination λ (3502 in FIG. 35AA) of λ4 of the optical wavelength path management information 210. The NE #1 (101) transmits the movement request 2101 from the inter-NE message transmitting unit 1903 to the adjacent NE (directional path #1) toward the branch (Drop) NE #3 (101) of the optical wavelength path.

The inter-NE message receiving unit 1904 of the NE #2 (101) receives the movement request from the directional path #1. The optical wavelength path movement preparing unit 1902 checks whether the optical wavelength λ3 set as the movement destination λ of the movement request 2101 is available. Since it is determined that the optical wavelength is available, the optical wavelength λ3 of the movement destination λ (3503 in FIG. 35AA) is set and reserved as a reserved path of the optical wavelength λ4 of the optical wavelength path management information. Since the mode of the NE #2 (101) is the through-setting, the process of the directional path #2 is also executed according to the movement request 2101 from the directional path #1.

As depicted in FIG. 35AB, at the time of suspension completion of the movement for optimization, the optical wavelength path movement preparing unit 1902 of the NE #2 (101) checks whether the optical wavelength λ3 specified in the movement request 2101 is available in the directional path #2. Since it is determined that the optical wavelength is not available, waiting for vacancy 3504 for the optical wavelength λ4 in the optical wavelength path management information 210 is set to "waiting". The movement destination λ (3505 in FIG. 35AB) of the directional path #1 set in response to the movement request 2101 from the insertion (Add) NE #1 (101) is set to "Non (no movement destination)". To notify the NE on the route to the insertion (Add) NE #1 (101) that the movement is blocked, the inter-NE message transmitting unit 1903 is requested to transmit the movement response 2101 set to "NG" to the adjacent NE #1 (101) on the directional path #1 side.

When the inter-NE message receiving unit 1904 of the NE #1 (101) receives "NG" as the movement response 2101, the optical wavelength path moving unit 203 sets the movement destination λ (3506 in FIG. 35AB) of the optical wavelength path management information 210 to "Non (no movement destination)" and sets waiting for vacancy 3507 to "waiting".

As depicted in FIG. 35AC, at the start of suspension cancellation of the movement for optimization, since the insertion (Add) path of the optical wavelength λ3 of the directional path #2 is deleted, the optical wavelength path setting unit 201 notifies the suspended path moving unit 204 of the deletion. The suspended path moving unit 204 determines that the deleted optical wavelength λ3 is included among the long-term-setting-paths 100A. Therefore, an optical wavelength having the waiting for vacancy set to "waiting" is checked for among the long-elapsed-period optical wavelength paths. Since the optical wavelength λ4 has waiting for vacancy 3508 set to "waiting", the inter-NE message transmitting unit 1903 is requested to transmit a notification of the path block cancellation.

As depicted in FIG. 35BD, at the time of request for suspension cancellation of the movement for optimization, the optical wavelength path movement preparing unit 1902 of the NE 101 confirms that the optical wavelength λ3 is deleted from the received notification of the path block cancellation and resumes the movement of the optical wavelength λ4 in the "waiting" state of the waiting for vacancy. The movement destination λ (3510 of FIG. 35BD) of the optical wavelength path management information 210 is set to the optical wavelength λ3 to reserve the movement destination. Waiting for vacancy 3511 is set to "none" to cancel the suspension. The NE #1 (101) requests the inter-NE message transmitting unit 1903 to transmit the movement request 2101 toward the branch (Drop) NE #3 (101) of the optical wavelength path.

As depicted in FIG. 35BE, at the time of completion of suspension cancellation of the movement for optimization, the inter-NE message receiving unit 1904 of the NE #2 (101) receives the movement request 2101 from the NE #1 (101) through the directional path #1. The optical wavelength path movement preparing unit 1902 checks whether the optical wavelength (λ3) set as the movement destination λ in the movement request 2101 is available in the directional path #1. Since it is determined that the optical wavelength is available, the optical wavelength λ3 is set and reserved as the movement destination λ (3512 of FIG. 35BE) of the optical wavelength λ4 of the directional path #1 in the optical wavelength path management information 210. Waiting for vacancy 3513 indicates "waiting" and therefore, is set to "none". Since the mode of the optical wavelength λ4 of the NE #2 (101) is the passage (Thru) setting, it is also checked whether the optical wavelength λ3 specified as the movement destination λ of the movement request 2101 is available in the directional path #2 of the NE #2 (101). Since it is determined that the optical wavelength is available, the optical wavelength λ3 is set as the movement destination λ (3512) and the waiting for vacancy 3513 is set to "none". The movement request 2101 is transferred to the directional path #2 of the adjacent NE #3 (101) toward the branch (Drop) NE #3 (101).

As depicted in FIG. 35BF, at the time of completion of the movement for optimization, the inter-NE message receiving unit 1904 of the NE #3 (101) receives the movement request from the NE #1 (101). Since a mode 3514 of the specified movement source λ is a branch (Drop) path, the optical wavelength path moving unit 203 checks whether the optical wavelength λ4 of the movement source set in the movement request 2101 is available. Since it is determined that the optical wavelength is available, the location of the optical wavelength set to λ4 in the optical wavelength path management information 210 is set to the optical wavelength λ3 specified as the movement destination λ of the movement request 2101. Since the optical wavelength path is branched (dropped) at the NE #3 (101), the NE #3 (101) changes the optical wavelength 3514 of the movement source specified in the movement request 2101 from λ4 to λ3.

The NE #3 (101) sets "OK" to transmit the acceptance of the movement request 2101 from the directional path #1 as the movement response 2101 to the NE #2 (101). The NE #2 (101) receives the movement response 2101 from the directional path #2 to move the optical wavelength λ4 to the reserved optical wavelength λ3. The NE #1 (101) receives the movement request 2101 from the directional path #1 to move the optical wavelength λ4 to the reserved optical wavelength λ3.

According to the second embodiment described above, based on the elapsed time of the optical wavelength path, the optical transmission apparatuses 101 on the transmission path performs the optical wavelength movement of a long-elapsed-period optical wavelength path having the prolonged elapsed time to the long-term-setting-path 100A among the predetermined optical wavelength range, in synchronization with the other optical transmission apparatuses 101. Even if the long-elapsed-period optical wavelength path having the prolonged elapsed time cannot be moved immediately, the movement suspended state is maintained and the movement can be performed as soon as a corresponding optical wavelength becomes available. As a result, the optical transmission apparatuses 101 can mutually manage and bring together in the predetermined long-term-setting-paths 100A, the long-elapsed-period optical wavelength paths used for a long period to thereby prevent dispersion and thus, eliminate the fragmentation of the unused areas of the optical wavelength paths in WDM transmission that uses multiple wavelengths. The second embodiment can eliminate, in terms of eliminating fragmentation, the need for the control by the OpS 401, which centrally manages the network.

According to the embodiments described above, based on the elapsed time after the optical wavelength path is set, long-elapsed-period optical wavelength paths having a long optical wavelength path setup period and subjects of the optimization are gather together in the predetermined long-term-setting-paths to prevent a scattering of the wavelengths. As a result, optical wavelengths capable of supporting short-period optical wavelength paths can be increased to ensure a larger settable number of the short-period optical wavelength paths and to increase the usage efficiency of the optical wavelengths of the WDM transmission. A long-distance optical wavelength path (long path) can easily be set. Since the long-elapsed-period optical wavelength paths are preferentially assigned to the predetermined long-term-setting-paths, the number of times that optical wavelengths are moved to optimize fragmentation can be reduced and the interruption of communication service can be suppressed to improve the quality of the communication signals.

The optical wavelength path rearranging method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an embodiment, the optical wavelength path to be rearranged can be properly determined and the fragmentation can be eliminated efficiently.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical wavelength path rearranging method comprising:
   setting an optical wavelength path to a newly-set-path optical wavelength range in an optical wavelength division multiplexing network;
   detecting time that elapses since the setting of the optical wavelength path; and
   moving to a predetermined long-period optical wavelength range different from the newly-set-path optical wavelength range, the optical wavelength path for which the detected elapsed time is longer than a predetermined constant period, wherein
   the optical wavelength path rearranging method is executed by a processor.

2. The optical wavelength path rearranging method according to claim 1, further comprising
   suspending movement of the optical wavelength path, when the optical wavelength path cannot be moved to the predetermined long-period optical wavelength range, wherein
   the moving includes moving the optical wavelength path to the long-period optical wavelength range, according to an occurrence of a vacancy of a movement destination optical wavelength within the long-period optical wavelength range.

3. The optical wavelength path rearranging method according to claim 1, further comprising
   comparing information concerning an optical wavelength of the optical wavelength path and a transmission section of the optical wavelength path against information concerning an available optical wavelength within the long-period optical wavelength range and the transmission section, wherein the moving includes moving the optical wavelength path to the available optical wavelength and the transmission section capable of accommodation.

4. A non-transitory, computer-readable recording medium that stores an optical wavelength path rearranging program that causes a computer to execute a process comprising:

setting an optical wavelength path to a newly-set-path optical wavelength range in an optical wavelength division multiplexing network;

detecting time that elapses since the setting of the optical wavelength path; and moving to a predetermined long-period optical wavelength range different from the newly-set-path optical wavelength range, the optical wavelength path for which the detected elapsed time is longer than a predetermined constant period.

5. The recording medium according to claim 4, further comprising suspending movement of the optical wavelength path, when the optical wavelength path cannot be moved to the predetermined long-period optical wavelength range, wherein the moving includes moving the optical wavelength path to the long-period optical wavelength range, according to an occurrence of a vacancy of a movement destination optical wavelength within the long-period optical wavelength range.

* * * * *